(12) United States Patent
Choi et al.

(10) Patent No.: US 10,315,639 B2
(45) Date of Patent: Jun. 11, 2019

(54) ELECTRIC BRAKE SYSTEM AND METHOD FOR LEAK CHECK OF THE SAME

(71) Applicant: MANDO CORPORATION, Gyeonggi-do (KR)

(72) Inventors: Seong-Ho Choi, Gyeonggi-do (KR); In-Wook Jeon, Seoul (KR); Hyun-Ho Kim, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 81 days.

(21) Appl. No.: 15/368,464

(22) Filed: Dec. 2, 2016

(65) Prior Publication Data
US 2017/0158184 A1 Jun. 8, 2017

(30) Foreign Application Priority Data

Dec. 4, 2015 (KR) ........................ 10-2015-0172058

(51) Int. Cl.
*B60T 8/40* (2006.01)
*B60T 17/22* (2006.01)
(Continued)

(52) U.S. Cl.
CPC ............ *B60T 17/221* (2013.01); *B60T 7/042* (2013.01); *B60T 8/4081* (2013.01);
(Continued)

(58) Field of Classification Search
CPC .......... B60T 7/042; B60T 8/4081; B60T 8/90; B60T 13/146; B60T 13/662;
(Continued)

(56) References Cited

U.S. PATENT DOCUMENTS

| 8,974,010 B2 * | 3/2015 | Yang ...................... B60T 13/686 |
| | | 303/113.4 |
| 9,145,119 B2 * | 9/2015 | Biller .................... B60T 8/4081 |

(Continued)

FOREIGN PATENT DOCUMENTS

| CN | 1978258 | 6/2007 |
| CN | 103241233 | 8/2013 |

(Continued)

OTHER PUBLICATIONS

Office Action dated Nov. 10, 2017 for German Patent Application No. 10 2016 224 057.9 and its English machine translation by Google Translate.

(Continued)

*Primary Examiner* — Thomas W Irvin
(74) *Attorney, Agent, or Firm* — Ladas & Parry, LLP

(57) ABSTRACT

A leakage inspecting method of an electric brake system, which includes a master cylinder connected to a reservoir, a simulation device having one side connected to the master cylinder to provide a reaction force according to the pedal effort of the brake pedal, a simulation valve provided at a flow path connected to the master cylinder or a flow path connected to the reservoir, a hydraulic pressure supply device operated by an electrical signal of a pedal displacement sensor sensing a displacement of the brake pedal and configured to generate hydraulic pressure, and a hydraulic pressure control unit, comprising: executing an inspection mode for inspecting for a leak of the simulation valve and a sealing member provided inside a chamber of the master cylinder by providing an inspection valve at a flow path connecting the master cylinder to the reservoir, wherein the inspection mode includes: (a1) closing a cut valve provided at a flow path connecting the master cylinder to the hydraulic pressure control unit when the inspection valve is open; (b1) pressurizing a piston disposed inside the master cylinder (Continued)

according to the pedal effort of the brake pedal and detecting whether pressure is formed through a pressure sensor; and (c1) determining that a leak does not exist when pressure detected through the pressure sensor satisfies a preset criterion.

20 Claims, 10 Drawing Sheets

(51) Int. Cl.
- *B60T 7/04* (2006.01)
- *B60T 13/14* (2006.01)
- *B60T 13/66* (2006.01)
- *B60T 13/68* (2006.01)
- *B60T 8/90* (2006.01)

(52) U.S. Cl.
CPC .......... *B60T 13/146* (2013.01); *B60T 13/662* (2013.01); *B60T 13/686* (2013.01); *B60T 8/90* (2013.01); *B60T 2270/406* (2013.01); *B60T 2270/82* (2013.01)

(58) Field of Classification Search
CPC ................ B60T 13/686; B60T 17/221; B60T 2270/406; B60T 2270/82
See application file for complete search history.

(56) References Cited

U.S. PATENT DOCUMENTS

| | | | | |
|---|---|---|---|---|
| 9,205,824 B2* | 12/2015 | Feigel | ................ | B60T 8/4081 |
| 9,308,905 B2* | 4/2016 | Biller | ................ | B60T 8/4081 |
| 9,315,180 B2* | 4/2016 | Jungbecker | ........... | B60T 8/4081 |
| 9,415,758 B2* | 8/2016 | Drumm | ................ | B60T 17/22 |
| 9,555,789 B2* | 1/2017 | Jeon | ................ | B60T 13/686 |
| 9,868,426 B2* | 1/2018 | Feigel | ................ | B60T 8/4018 |
| 9,981,645 B2* | 5/2018 | Kim | ................ | B60T 8/348 |
| 10,093,295 B2* | 10/2018 | Kim | ................ | B60T 8/4081 |
| 10,173,659 B2* | 1/2019 | Kim | ................ | B60T 13/146 |
| 2014/0028084 A1* | 1/2014 | Biller | ................ | B60T 8/4081 |
| | | | | 303/9.62 |
| 2014/0117749 A1 | 5/2014 | Yang et al. | | |
| 2015/0035353 A1 | 2/2015 | Drumm | | |
| 2016/0009263 A1* | 1/2016 | Feigel | ................ | B60T 8/321 |
| | | | | 303/15 |
| 2017/0072928 A1* | 3/2017 | Kim | ................ | B60T 8/4081 |
| 2017/0106843 A1* | 4/2017 | Jeong | ................ | B60T 8/90 |
| 2017/0144642 A1* | 5/2017 | Kim | ................ | B60T 7/042 |
| 2017/0144644 A1* | 5/2017 | Kim | ................ | B60T 13/146 |
| 2017/0210369 A1* | 7/2017 | Lim | ................ | B60T 7/042 |
| 2017/0334417 A1* | 11/2017 | Choi | ................ | B60T 13/68 |
| 2018/0111593 A1* | 4/2018 | Kim | ................ | B60T 8/88 |
| 2018/0111594 A1* | 4/2018 | Kim | ................ | B60T 8/17 |
| 2018/0339690 A1* | 11/2018 | Kim | ................ | B60T 13/745 |
| 2018/0339692 A1* | 11/2018 | Jeong | ................ | B60T 8/4081 |

FOREIGN PATENT DOCUMENTS

| | | |
|---|---|---|
| CN | 103303285 | 9/2013 |
| CN | 103786707 | 5/2014 |
| DE | 10 2016 217 273 | 3/2017 |
| DE | 10 2016 220 485 | 4/2017 |
| EP | 2 520 473 | 11/2012 |
| KR | 10-2015-0040714 | 4/2015 |

OTHER PUBLICATIONS

Office Action dated Nov. 2, 2018 for Chinese Patent Application No. 201611102470.4 and its English machine translation by Google Translate.

* cited by examiner

[Fig. 1]
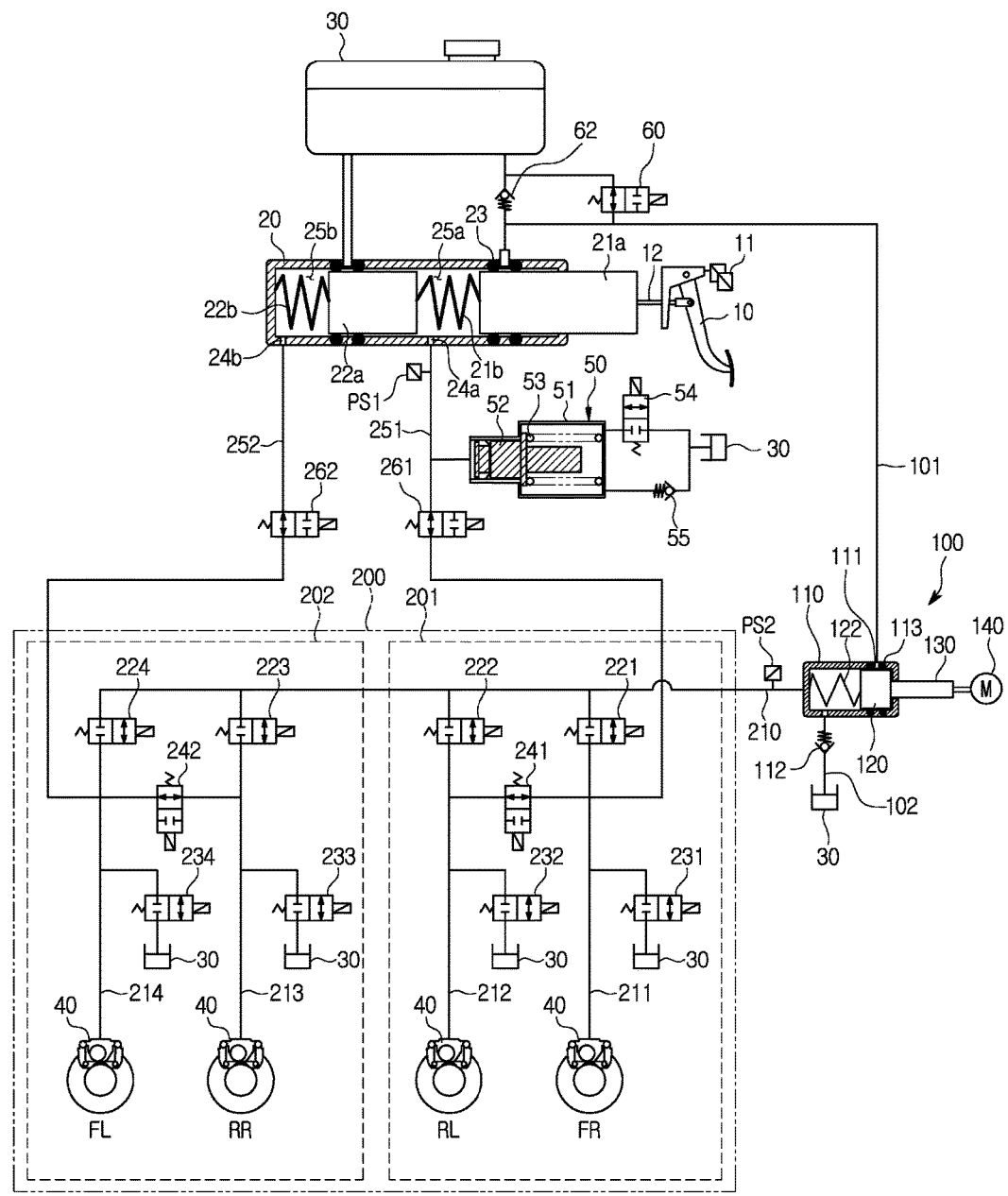

[Fig. 2]
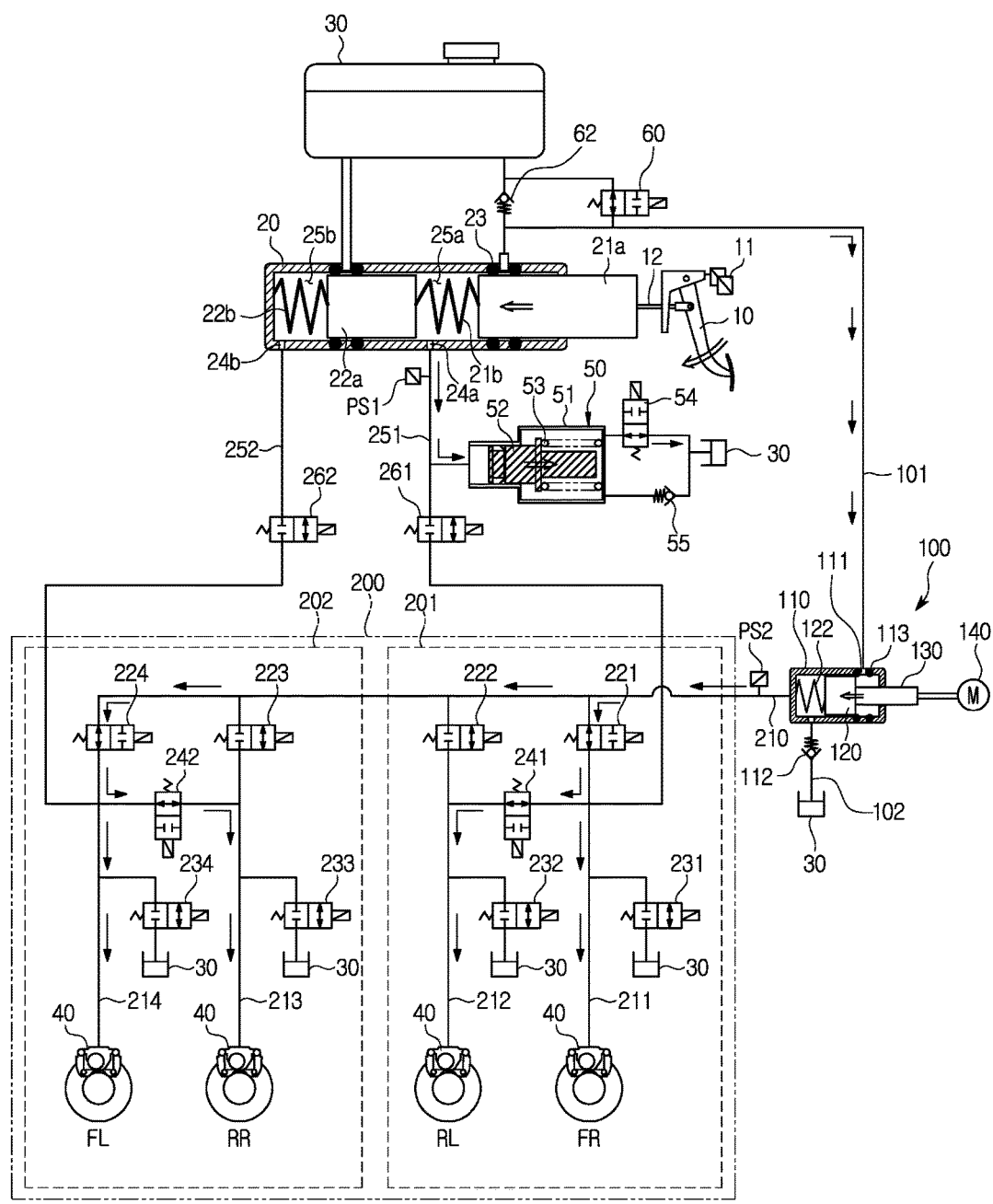

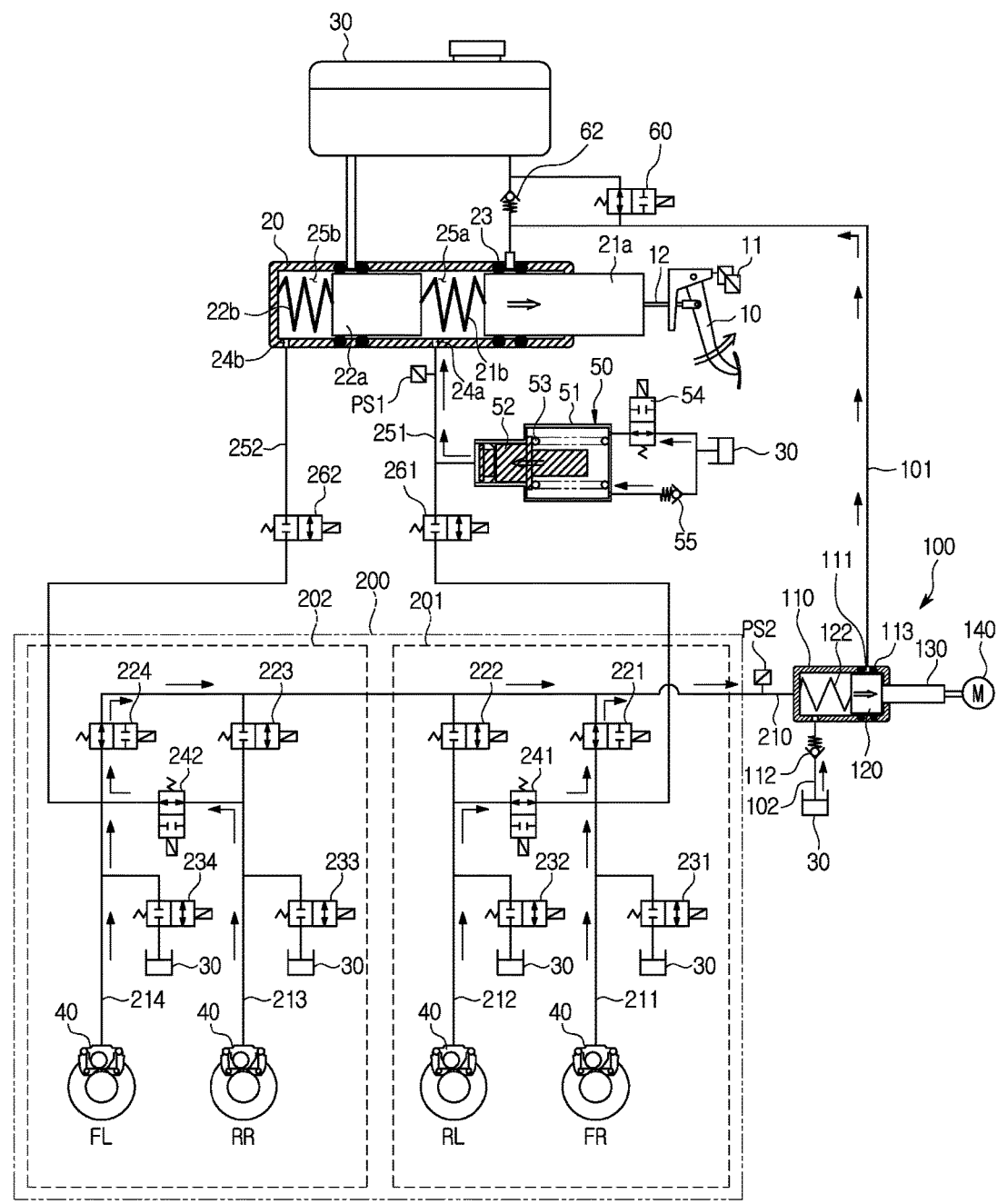
[Fig. 3]

[Fig. 4]
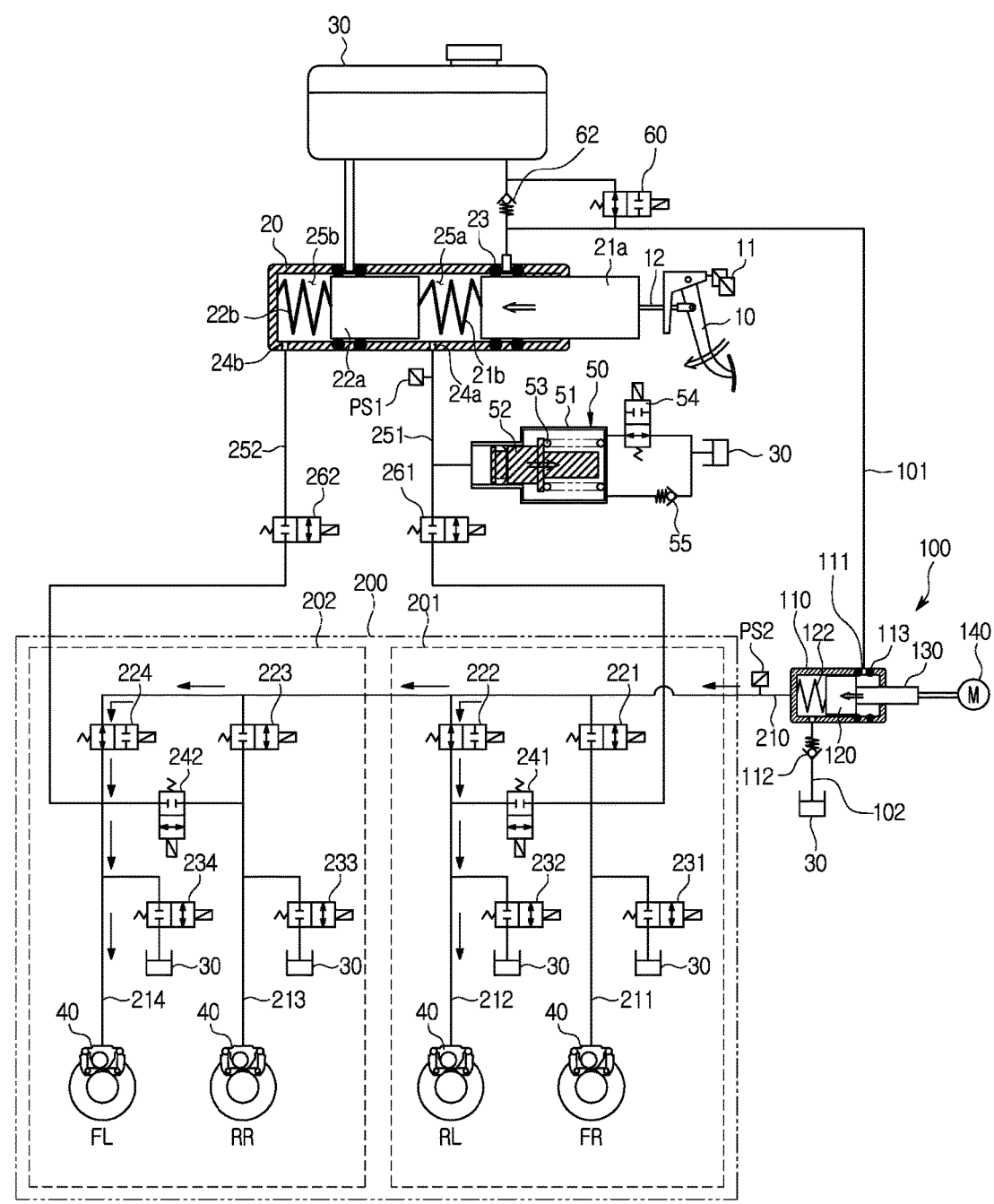

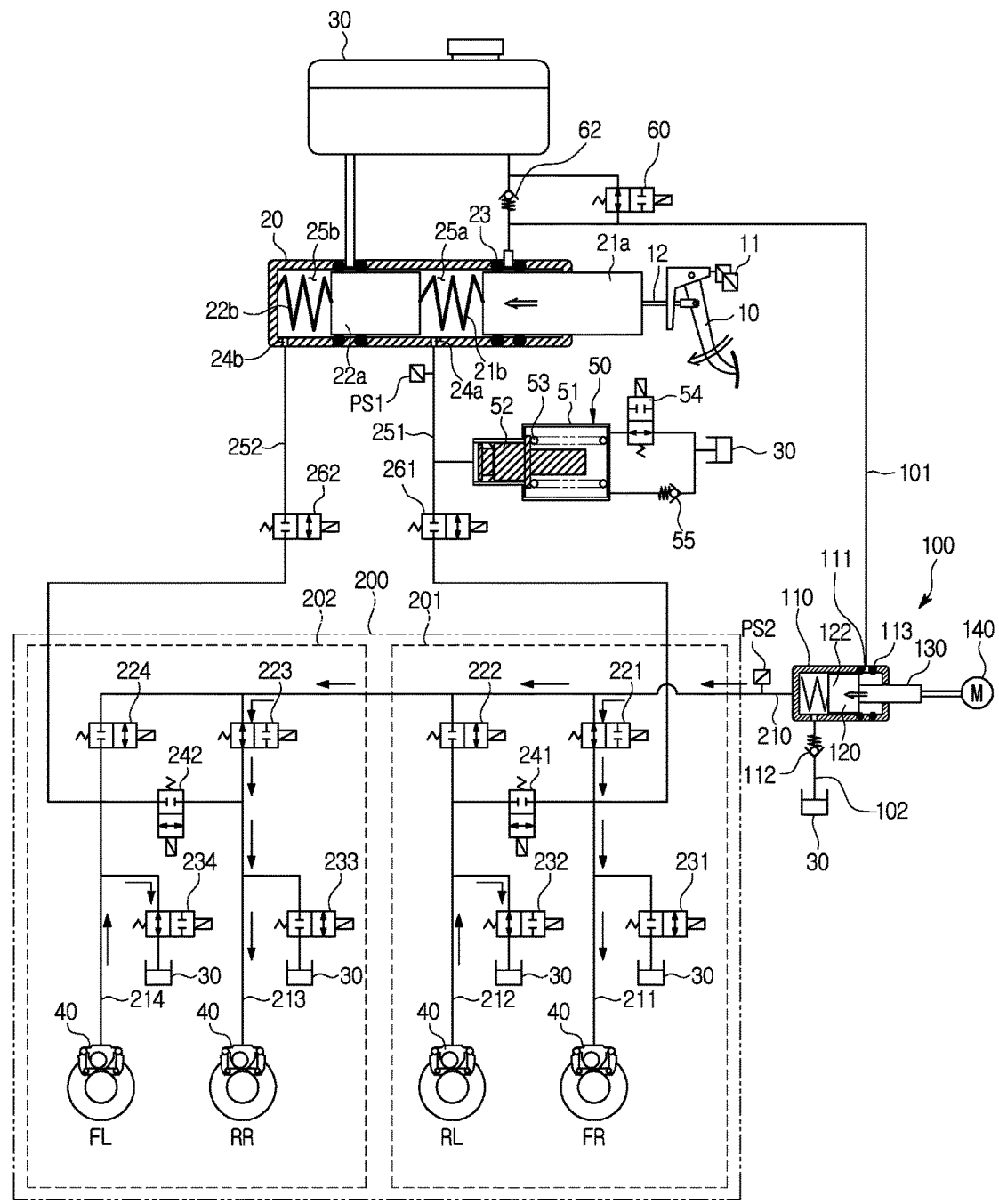
[Fig. 5]

[Fig. 6]
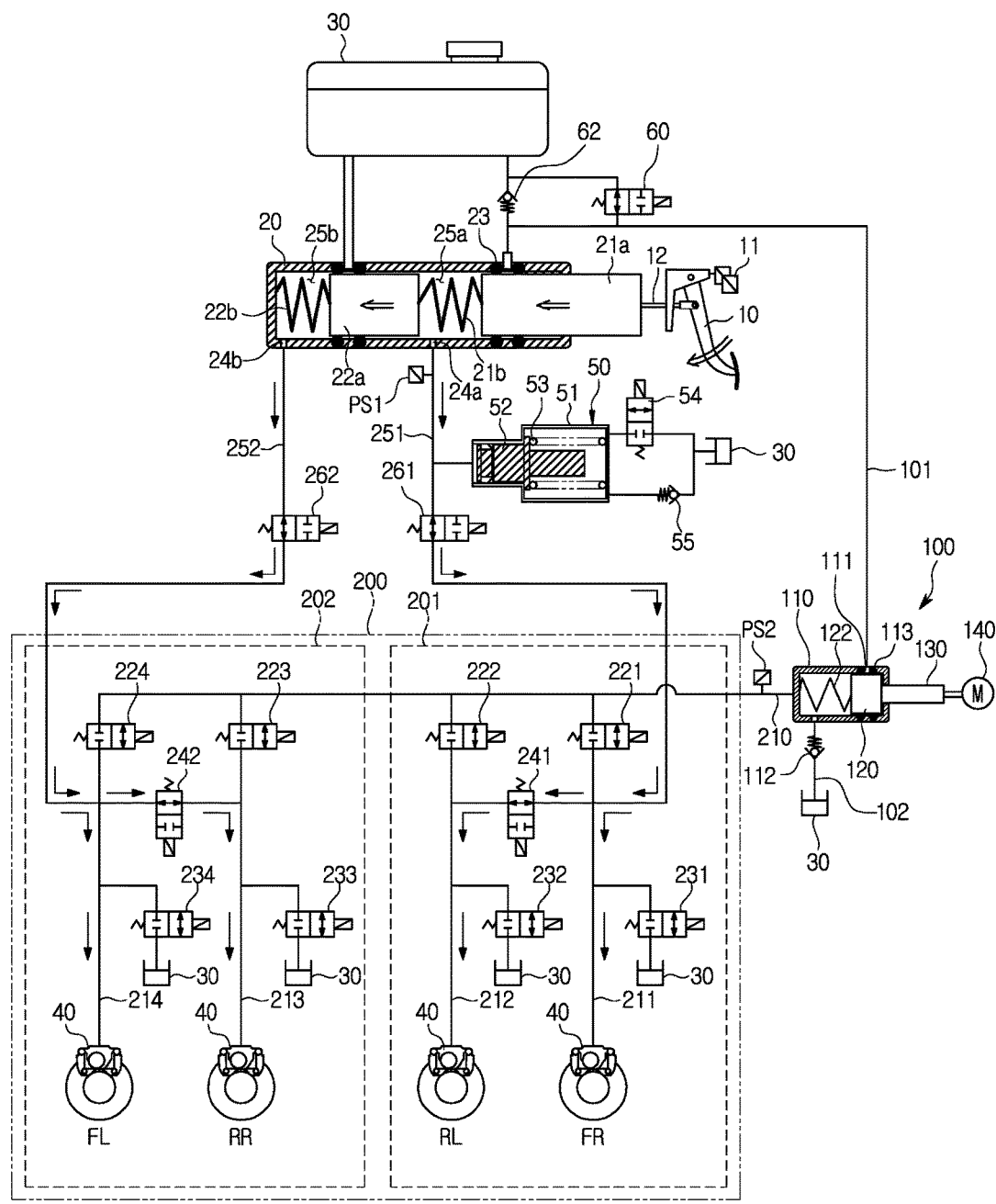

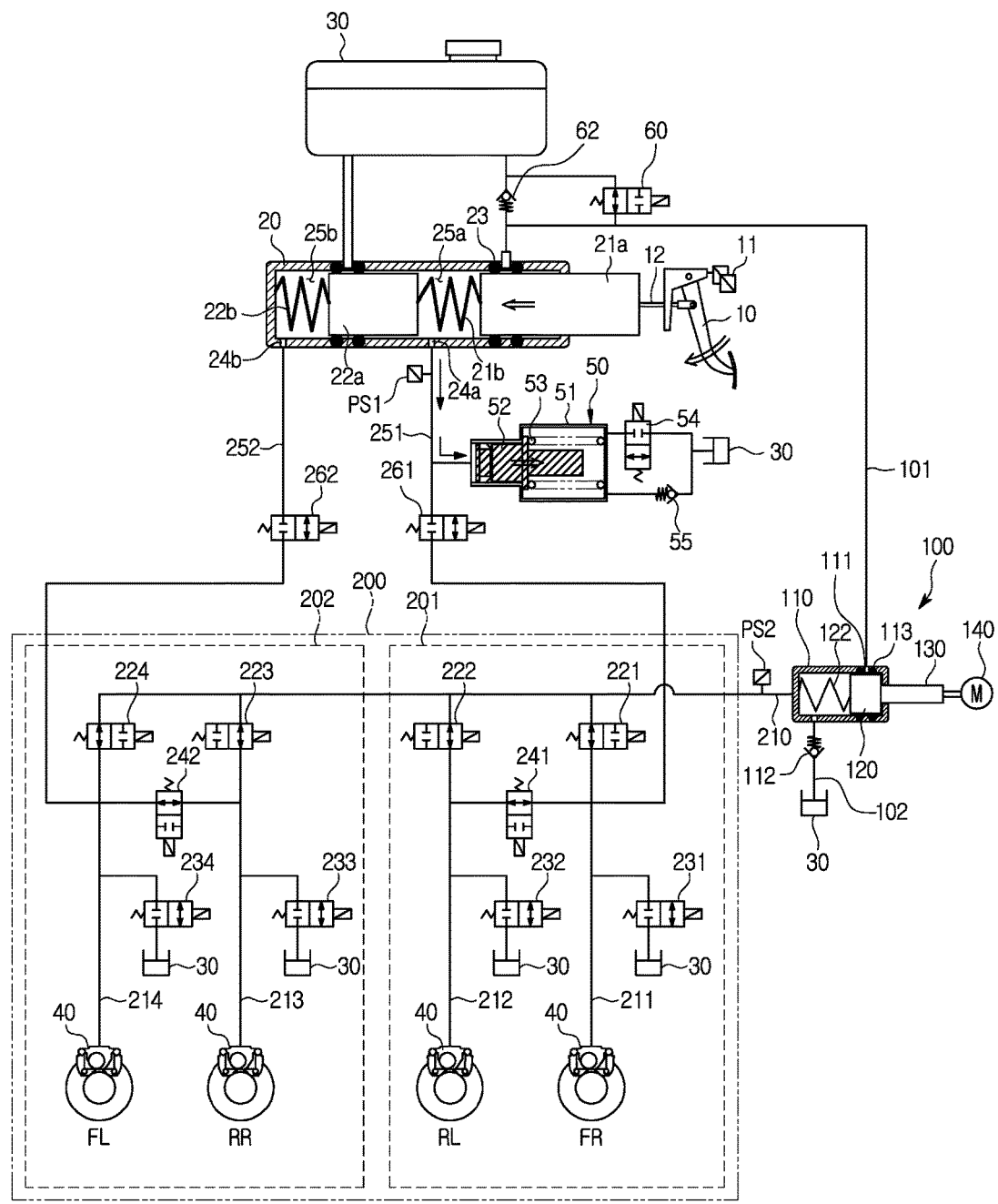
[Fig. 7]

[Fig. 8]
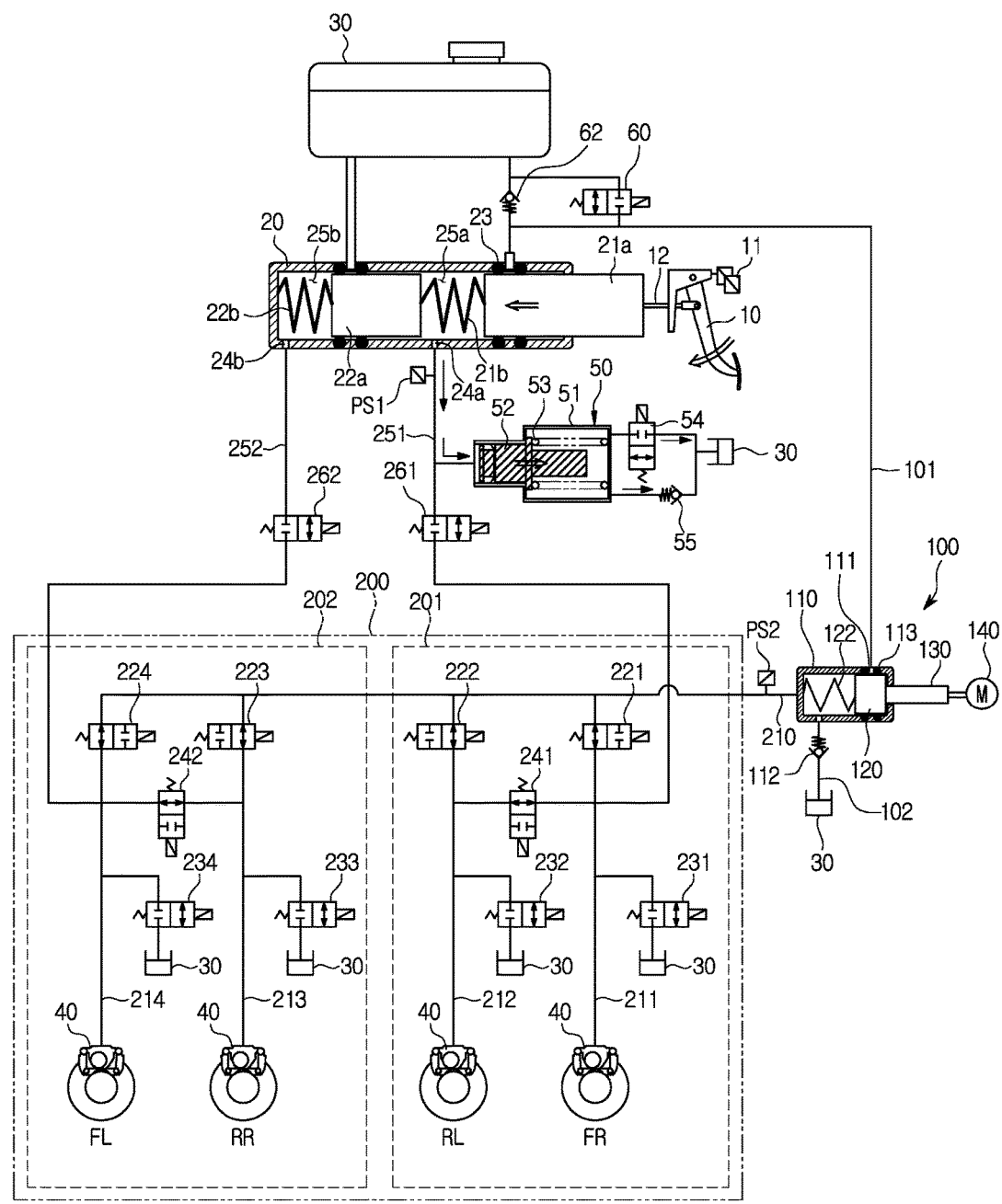

[Fig. 9]
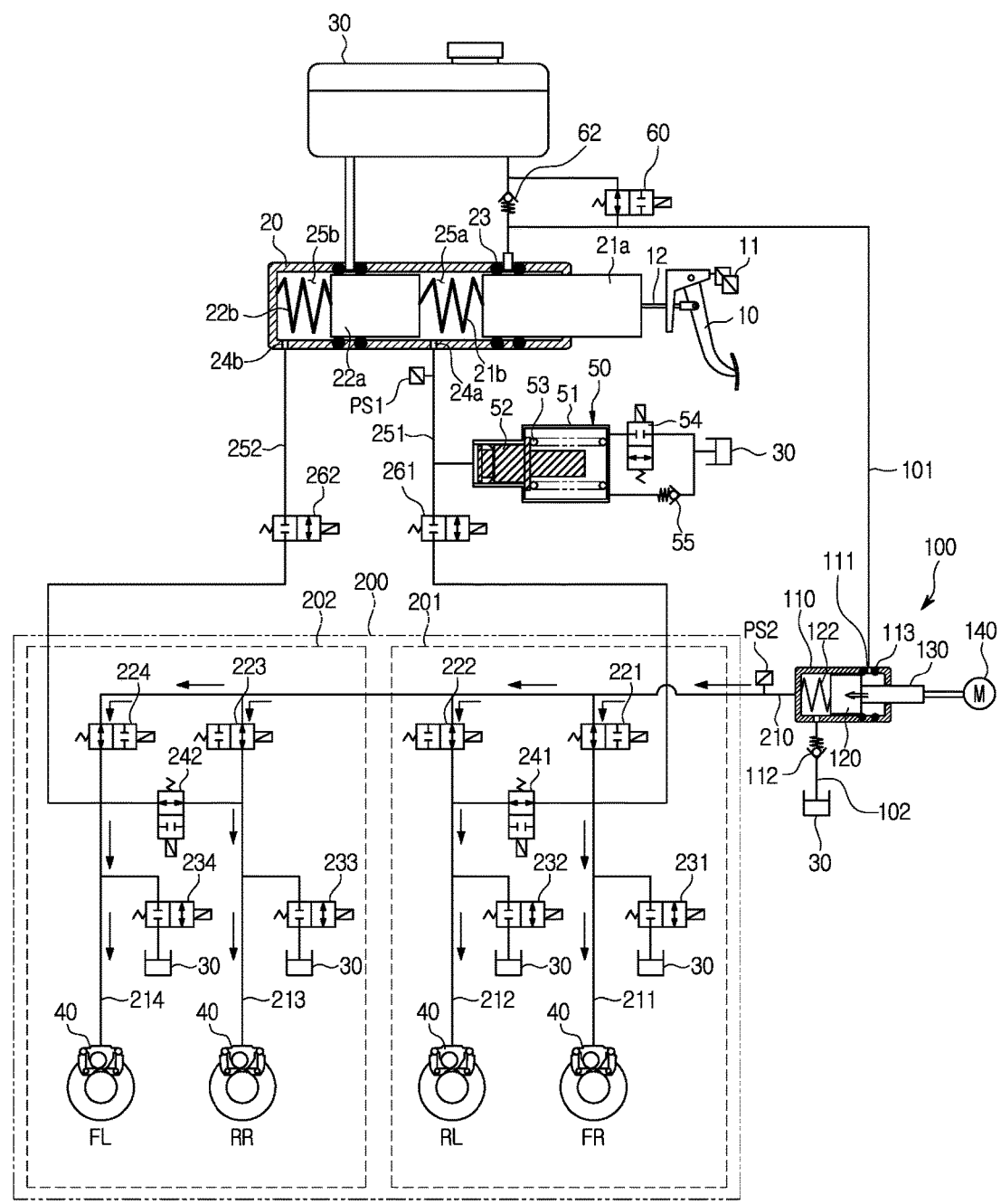

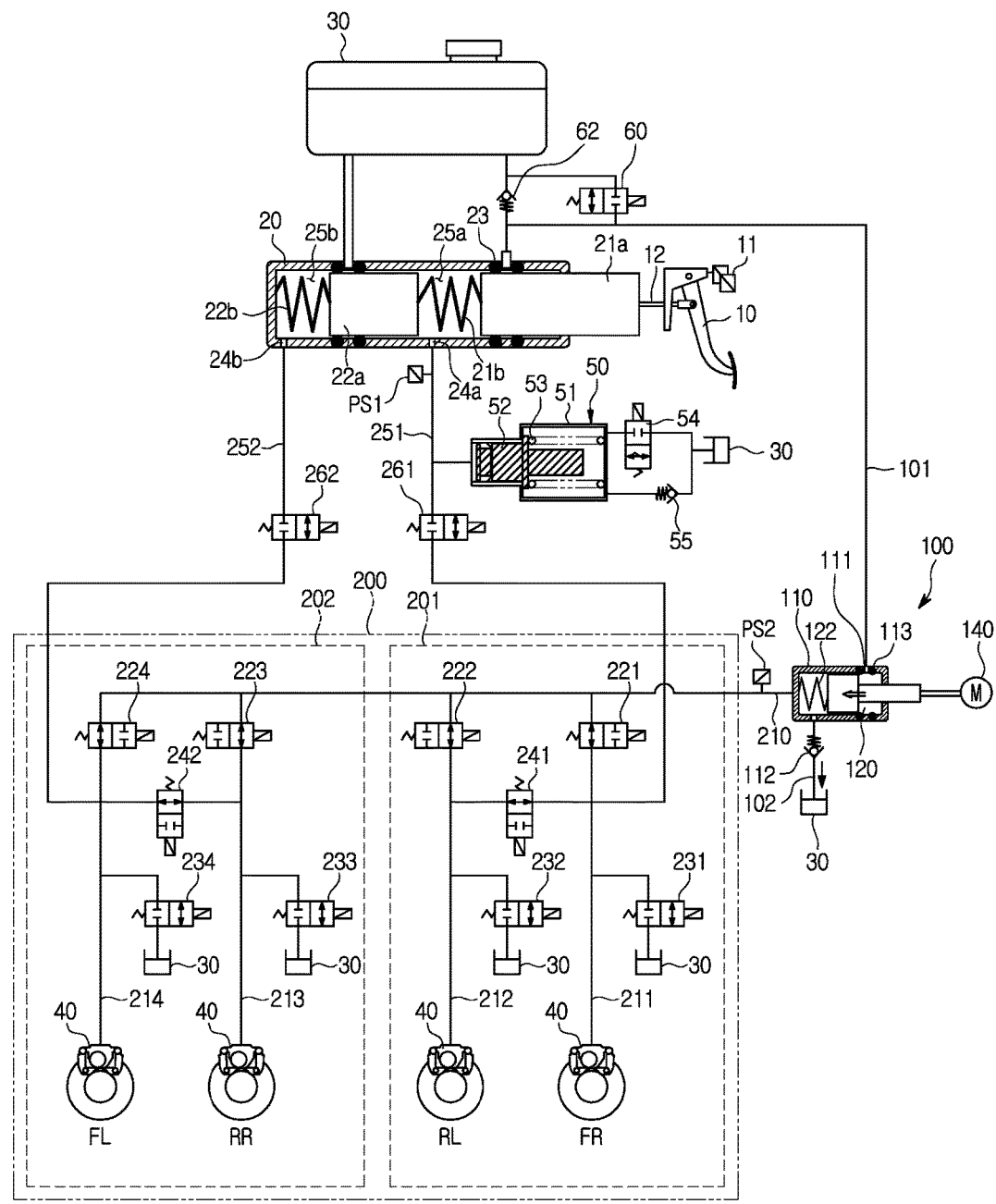
[Fig. 10]

ELECTRIC BRAKE SYSTEM AND METHOD FOR LEAK CHECK OF THE SAME

This application claims the benefit of Korean Patent Application No. 2015-0172058, filed on Dec. 4, 2015 in the Korean Intellectual Property Office, the disclosure of which is incorporated herein by reference.

BACKGROUND

1. Field

Embodiments of the present disclosure relate to an electric brake system, and more particularly, to an electric brake system generating a braking force using an electrical signal corresponding to a displacement of a brake pedal, and an inspection method capable of inspecting whether a hydraulic pressure leak occurs using the same.

2. Description of the Related Art

A brake system for braking is necessarily mounted on a vehicle, and a variety of systems for providing stronger and more stable braking have been proposed recently.

For example, there are brake systems including an anti-lock brake system (ABS) for preventing a wheel from sliding while braking, a brake traction control system (BTCS) for preventing a driving wheel from slipping when a vehicle is—quickly started and accelerated, an electronic stability control (ESC) system for stably maintaining a driving state of a vehicle by combining an ABS with traction control to control hydraulic pressure of a brake, and the like.

Generally, an electric brake system includes a hydraulic pressure supply device which receives a braking intent of a driver in the form of an electrical signal from a pedal displacement sensor which senses a displacement of a brake pedal when the driver steps on the brake pedal, and then supplies hydraulic pressure to a wheel cylinder.

An electric brake system configured with such a hydraulic pressure supply device is disclosed in European Registered Patent No. EP 2 520 473. According to the disclosure in that document, the hydraulic pressure supply device is configured such that a motor is operated according to a pedal effort of a brake pedal to generate braking pressure. At this point, the braking pressure is generated by converting a rotational force of the motor into a rectilinear movement to pressurize a piston.

Also, the electric brake system includes a simulation device capable of providing a driver with a reaction force according to the pedal effort of the brake pedal. At this point, the simulation device is connected to an oil reservoir, and a simulation valve is installed at an oil flow path which connects the simulation device to the oil reservoir. The simulation valve is provided to be closed when the electric brake system operates abnormally and to deliver hydraulic pressure discharged from a master cylinder to the wheel cylinder so that stable braking may be performed.

However, in such an electric brake system, when a leak occurs at a component provided at a hydraulic circuit connecting the master cylinder to the wheel cylinder or at a component provided at the hydraulic circuit connecting the hydraulic pressure supply device to the wheel cylinder, there is a problem in that a dangerous situation may be caused by a braking force intended by the driver not being generated.

PRIOR ART DOCUMENT (Patent Document) European Registered Patent No. EP 2 520 473 A1 (Honda Motor Co., Ltd.), Nov. 7, 2012.

SUMMARY

Therefore, it is an aspect of the present disclosure to provide an electric brake system and a leakage inspecting method thereof which are capable of inspecting for hydraulic pressure leakage from the electric brake system while a vehicle is stopped to prevent an occurrence of an accident.

Additional aspects of the disclosure will be set forth in part in the description which follows and, in part, will be obvious from the description, or may be learned by practice of the disclosure.

In accordance with one aspect of the present invention, there is provided a leakage inspecting method of an electric brake system, which includes a master cylinder connected to a reservoir that stores oil therein and configured to generate hydraulic pressure according to a pedal effort of a brake pedal, a simulation device having one side connected to the master cylinder to provide a reaction force according to the pedal effort of the brake pedal, the other side connected to the reservoir, and a simulation valve provided at a flow path connected to the master cylinder or a flow path connected to the reservoir, a hydraulic pressure supply device operated by an electrical signal of a pedal displacement sensor sensing a displacement of the brake pedal and configured to generate hydraulic pressure, and a hydraulic pressure control unit configured to control hydraulic pressure discharged from one or more of the master cylinder and the hydraulic pressure supply device and deliver the hydraulic pressure to a wheel cylinder provided at each of wheels, comprising: executing an inspection mode for inspecting for a leak of the simulation valve and a sealing member provided inside a chamber of the master cylinder by providing an inspection valve at a flow path connecting the master cylinder to the reservoir, wherein the inspection mode includes: (a1) closing a cut valve provided at a flow path connecting the master cylinder to the hydraulic pressure control unit when the inspection valve is open; (b1) pressurizing a piston disposed inside the master cylinder according to the pedal effort of the brake pedal and detecting whether pressure is formed through a pressure sensor; and (c1) determining that a leak does not exist when pressure detected through the pressure sensor satisfies a preset criterion.

Also, when the pressure detected through the pressure sensor in the operation (c1) does not satisfy the preset criterion, determining that a leak has occurred at one or more of the simulation valve and the sealing member.

Also, the leakage inspecting method of an electric brake system further comprising: (d1) returning the brake pedal to an original position thereof; (e1) closing the inspection valve, the simulation valve, and the cut valve to alter the chamber of the master cylinder to form a closed circuit; (f1) pressurizing the piston disposed inside the master cylinder according to the pedal effort of the brake pedal and detecting whether pressure is formed through the pressure sensor; and (g1) determining that the leak has occurred at the sealing member when the pressure detected through the pressure sensor satisfies the preset criterion, and determining that the leak has occurred at the simulation valve when the pressure detected through the pressure sensor does not satisfy the preset criterion.

In accordance with other aspect of the present invention, there is provided a leakage inspecting method of an electric brake system, which includes a master cylinder connected to a reservoir that stores oil therein and configured to generate hydraulic pressure according to a pedal effort of a brake pedal, a simulation device having one side connected to the master cylinder to provide a reaction force according to the pedal effort of the brake pedal, a hydraulic pressure supply device operated by an electrical signal of a pedal displacement sensor sensing a displacement of the brake pedal and configured to generate hydraulic pressure, and a hydraulic pressure control unit configured to control hydraulic pressure discharged from one or more of the master cylinder and the hydraulic pressure supply device and deliver the hydraulic pressure to a wheel cylinder provided at each of wheels, comprising: executing an inspection mode for inspecting for a leak of a sealing member provided inside a hydraulic pressure chamber of the hydraulic pressure supply device and a check valve provided at a flow path connected to a reservoir at an outlet side of the hydraulic pressure supply device by providing an inspection valve at a flow path connecting the reservoir to an oil port of the hydraulic pressure supply device, wherein the inspection mode includes: (a2) closing a cut valve provided at a flow path connecting the master cylinder to the hydraulic pressure control unit when the inspection valve is open; (b2) operating the hydraulic pressure supply device to pressurize a hydraulic piston provided inside the hydraulic pressure chamber of the hydraulic pressure supply device and detecting whether pressure is formed through a pressure sensor; and (c2) determining that a leak does not exist when pressure detected through the pressure sensor satisfies a preset criterion.

Also, when the pressure detected through the pressure sensor in operation (c2) does not satisfy the preset criterion, determining that a leak has occurred at one or more of the sealing member and the check valve.

Also, the leakage inspecting method of an electric brake system further comprising: (d2) returning the hydraulic piston of the hydraulic pressure supply device to original position thereof; (e2) closing the inspection valve and the cut valve to alter the hydraulic pressure chamber of the hydraulic pressure supply device to form a closed circuit; (f2) operating the hydraulic pressure supply device to pressurize the hydraulic piston provided inside the hydraulic pressure chamber of the hydraulic pressure supply device and detecting whether pressure is formed through the pressure sensor; and (g2) determining that the leak has occurred at the sealing member when the pressure detected through the pressure sensor satisfies the preset criterion, and determining that the leak has occurred at the check valve when the pressure detected through the pressure sensor does not satisfy the preset criterion.

In accordance with other aspect of the present invention, there is provided an electric brake system, which includes a reservoir configured to store oil therein, a master cylinder having first and second hydraulic ports and coupled to the reservoir to receive the oil, a pedal displacement sensor configured to sense a displacement of a brake pedal, and a simulation device connected to the master cylinder and provided to supply a reaction force according to a pedal effort of the brake pedal, comprising: a hydraulic pressure supply device configured to output an electrical signal corresponding to an operation of the brake pedal through the pedal displacement sensor to operate a motor and convert a rotational force of the motor into a rectilinear movement; a hydraulic pressure control unit including first and second hydraulic circuits connected to the hydraulic pressure supply device through a hydraulic flow path, and configured to receive hydraulic pressure by means of a force generated by the hydraulic pressure supply device and control a flow of the hydraulic pressure delivered to wheel cylinders which are respectively provided at wheels; and an electronic control unit configured to control the motor and valves on the basis of hydraulic pressure information and pedal displacement information, wherein the electric brake system further includes: an inspection valve including an inner flow path having one side connected to the reservoir and the other side disposed to be connected to the master cylinder and the hydraulic pressure supply device through a branching flow path, and wherein the inspection valve is provided to open a flow path connecting the reservoir to the master cylinder and a flow path connecting the reservoir to the hydraulic pressure supply device in a braking mode, and close one or more of the flow path connecting the reservoir to the master cylinder and the flow path connecting the reservoir to the hydraulic pressure supply device.

Also, the hydraulic pressure control unit includes: first to fourth inlet valves respectively provided at an upstream side of the wheel cylinders and configured to control the hydraulic pressure delivered to the wheel cylinders respectively installed at the wheels; first to fourth dump valves configured to respectively control a flow of hydraulic pressure discharged from the wheel cylinder; and first and second balance valves respectively disposed between the first to fourth inlet valves and first to fourth dump valves, wherein the first balance valve is connected to two inlet valves among the first to fourth inlet valves and the second balance valve is connected to the remaining two inlet valves.

Also, one of the two inlet valves connected to each other through the first balance valve and one of the two inlet valves connected to each other through the second balance valve are open so that the hydraulic pressure is delivered to the wheel cylinders respectively installed at the wheels.

Also, the first to fourth inlet valves are configured with normally closed type solenoid valves that are usually closed and are opened when an opening signal is received.

Also, the first to fourth dump valves are configured with normally closed type solenoid valves that are usually closed and are opened when an opening signal is received.

Also, the first and second balance valves are configured with normally open type solenoid valves that are usually open and are closed when a closing signal is received from the electronic control unit.

Also, the leakage inspecting method of an electric brake system further comprising: a first backup flow path configured to connect the first hydraulic port to the first balance valve directly supply oil to the wheel cylinder when the electric brake system operates abnormally; a second backup flow path configured to connect the second hydraulic port to the second balance valve; a first cut valve provided at the first backup flow path and configured to control a flow of the oil therein; and a second cut valve provided at the second backup flow path and configured to control a flow of the oil therein.

Also, the first and second cut valves are configured with normally open type solenoid valves that are usually open and are closed when a closing signal is received from the electronic control unit.

Also, the inspection valve is configured with a normally open type solenoid valve that is usually open and is closed when a closing signal is received from the electronic control unit.

Also, the leakage inspecting method of an electric brake system further comprising: a first pressure sensor provided at a flow path connecting the master cylinder to the simulation device; and a second pressure sensor provided at a hydraulic flow path connecting the hydraulic pressure supply device and the hydraulic pressure control unit.

Also, the hydraulic pressure supply device includes: a motor configured to generate a rotational force in response to the electrical signal of the pedal displacement sensor; a power conversion unit configured to convert the rotational force of the motor into a rectilinear movement; a hydraulic piston connected to the power conversion unit and configured to perform rectilinear movement; a hydraulic pressure chamber provided so that the hydraulic piston slides therein and connected to the first and second hydraulic circuits though the hydraulic flow path; and a hydraulic spring provided inside the hydraulic pressure chamber and configured to elastically support the hydraulic piston, wherein the hydraulic pressure chamber is configured to be connected to the reservoir through an oil port and to receive the oil.

Also, a communicating hole is formed to be connected to the reservoir at an outlet side of the hydraulic pressure chamber, and a check valve is provided at a flow path connecting the communicating hole and the reservoir and configured to enable the oil to flow from the reservoir to the hydraulic pressure chamber and block the oil from flowing from the hydraulic pressure chamber to the reservoir.

Also, the simulation valve and a simulation check valve are provided in parallel at a flow path which connects a rear end part of a simulation chamber of the simulation device and the reservoir.

Also, the simulation valve is configured with a normally closed type solenoid valve that is usually closed and is opened when an opening signal is received.

BRIEF DESCRIPTION OF THE DRAWINGS

FIG. 1 is a hydraulic circuit diagram illustrating a non-braking state of an electric brake system according to one embodiment of the present disclosure.

FIG. 2 is a hydraulic circuit diagram illustrating a state in which the electric brake system according to one embodiment of the present disclosure normally performs a braking operation.

FIG. 3 is a hydraulic circuit diagram illustrating a case of releasing a braking force in a braking state established when the electric brake system operates normally.

FIG. 4 is a hydraulic circuit diagram illustrating a case of braking only a corresponding wheel cylinder while an anti-lock brake system (ABS) is operated.

FIG. 5 is a hydraulic circuit diagram illustrating a case in which the electric brake system operates in a dump mode and discharges hydraulic pressure from only a corresponding wheel cylinder.

FIG. 6 is a hydraulic circuit diagram illustrating a case in which the electric brake system according to one embodiment of the present disclosure operates abnormally.

FIG. 7 and FIG. 8 are hydraulic circuit diagrams illustrating a state of inspecting whether a leak occurs in an electric brake system according to another embodiment of the present disclosure.

FIG. 9 and FIG. 10 are hydraulic circuit diagrams illustrating a state of inspecting whether a leak occurs in an electric brake system according to still another embodiment of the present disclosure.

DETAILED DESCRIPTION

Hereinafter, embodiments of the present disclosure will be described in detail with reference to the accompanying drawings. The embodiments to be described below are provided to fully convey the spirit of the present disclosure to those skilled in the art. The present disclosure is not limited to the embodiments disclosed herein and may be implemented in other forms. In the drawings, some portions not related to the description will be omitted and will not be shown in order to clearly describe the present disclosure, and also sizes of components may be somewhat exaggerated to facilitate understanding.

FIG. 1 is a hydraulic circuit diagram illustrating a non-braking state of an electric brake system according to one embodiment of the present disclosure.

Referring to FIG. 1, the electric brake system generally includes a master cylinder 20 configured to generate hydraulic pressure, a reservoir 30 coupled to an upper part of the master cylinder 20 to store oil, an input rod 12 configured to pressurize the master cylinder 20 according to a pedal effort of a brake pedal 10, a wheel cylinder 40 configured to receive the hydraulic pressure and perform braking of each of wheels RR, RL, FR, and FL, a pedal displacement sensor 11 configured to sense a displacement of the brake pedal 10, and a simulation device 50 configured to provide a reaction force according to the pedal effort of the brake pedal 10.

The master cylinder 20 may be configured to include at least one chamber and generate hydraulic pressure. As shown in the drawings, the master cylinder 20 may be configured to include two chambers 25a and 25b. A first piston 21a and a second piston 22a are respectively provided at the two chambers 25a and 25b, and the first piston 21a and the input rod 12 come into contact with each other. The reason for providing the two chambers 25a and 25b in the master cylinder 20 is for securing safety even when one of the two chambers 25a and 25b fails. For example, a first chamber 25a of the two chambers 25a and 25b is connected to a front right wheel FR and a rear left wheel RL and a second chamber 25b is connected to a front left wheel FL and a rear right wheel RR. Alternatively, the first chamber 25a of two chambers 25a and 25b may be connected to the two front wheels FR and FL and the second chamber 25b may be connected to the two rear wheels RR and RL. As described above, the reason for independently configuring the two chambers 25a and 25b is for making braking of a vehicle possible even when one of the two chambers 25a and 25b fails. First and second hydraulic ports 24a and 24b configured to respectively discharge hydraulic pressure from the first and second chambers 25a and 25b are formed at the master cylinder 20.

Also, a first spring 21b is provided between the first piston 21a and the second piston 22a of the master cylinder 20, and a second spring 22b is provided between the second piston 22a and an end of the master cylinder 20. That is, the first spring 21b and the second spring 22b are respectively provided at the two chambers 25a and 25b to store an elastic force when the first piston 21a and the second piston 22a are compressed. When a force pushing the first piston 21a is less than the elastic force, the elastic force pushes the first and second pistons 21a and 22a and respectively returns the first and second pistons 21a and 22a to original positions thereof.

Further, the master cylinder 20 includes a sealing member 23 which is provided to seal a gap between an inner side of the master cylinder 20 and an outer side of each of the two chambers 25a and 25b. The sealing member 23 prevents oil from leaking through a gap between an inner circumferential surface of the master cylinder 20 and each of the first and second pistons 21a and 22a, thereby enabling high hydraulic pressure to form. The sealing member 23 may be provided at both sides of each part connected to the reservoir 30, and may be installed at an accommodating depression (not shown) which is formed at an inner surface of the master cylinder 20 to prevent the sealing member 23 from being moved even when the first and second pistons 21a and 22a move forward and backward.

Meanwhile, the input rod 12 pressurizing the first piston 21*a* of the master cylinder 20 comes into close contact with the first piston 21*a* so that there is no gap between the master cylinder 20 and the input rod 12. That is, when the brake pedal 10 is stepped on, the master cylinder 20 may be directly pressurized without a pedal dead stroke section.

The simulation device 50 is connected to a first backup flow path 251, which will be described below, to provide a reaction force according to the pedal effort of the brake pedal 10. As shown in the drawing, the simulation device 50 includes a simulation chamber 51 provided to store oil discharged from the first hydraulic port 24*a* of the master cylinder 20 therein, a reaction force piston 52 provided inside the simulation chamber 51, a pedal simulator provided with a reaction force spring 53 elastically supporting the reaction force piston 52, and a simulation valve 54 connected to a rear end part of the simulation chamber 51. At this point, the reaction force piston 52 and the reaction force spring 53 are each installed to have a predetermined range of displacement within the simulation chamber 51 by oil flowing therein.

Meanwhile, the reaction force spring 53 shown in the drawing is merely one embodiment capable of providing an elastic force to the reaction force piston 52, and thus it may include numerous embodiments capable of storing an elastic force through shape deformation. As one example, the reaction force spring 53 includes a variety of members which store elastic force by being configured with a material including rubber and the like or have a coil or plate shape.

The simulation valve 54 may be provided at a flow path connecting a rear end of the simulation chamber 51 to the reservoir 30. That is, an inlet of the simulation chamber 51 is connected to the master cylinder 20, the rear end of the simulation chamber 51 is connected to the simulation valve 54, and the simulation valve 54 is connected to the reservoir 30. Therefore, when the reaction force piston 52 is returned to the original position thereof, oil inside the reservoir 30 may flow through the simulation valve 54 so that an inside of the simulation chamber 51 may be entirely filled with the oil.

Such a simulation valve 54 is configured with a normally closed type solenoid valve that usually maintains a closed state. When the driver steps on the brake pedal 10, the simulation valve 54 is opened to deliver brake oil to the simulation chamber 51.

Also, a simulation check valve 55 may be installed to be connected in parallel with the simulation valve 54 between the simulation device 50 and the reservoir 30. The simulation check valve 55 may be configured to allow the oil inside the reservoir 30 to only flow toward the simulation chamber 51. That is, the reaction force piston 52 of the pedal simulator compresses the reaction force spring 53 so that oil inside the simulation chamber 51 is delivered to the reservoir 30 through the simulation valve 54. Therefore, since the inside of the simulation chamber 51 is in a state in which oil is filled therein, friction of the reaction force piston 52 is minimized when the simulation device 50 is operated so that durability of the simulation device 50 may be improved and also a configuration for blocking introduction of foreign materials from the outside is provided.

In addition, when the pedal effort of the brake pedal 10 is released, oil is supplied inside the simulation chamber 51 through the simulation check valve 55 to ensure a rapid return of pressure of the pedal simulator.

The electric brake system according to one embodiment of the present disclosure includes a hydraulic pressure supply device 100 which is mechanically operated by receiving a braking intent of the driver in the form of an electrical signal from the pedal displacement sensor 11 which senses a displacement of the brake pedal 10, a hydraulic pressure control unit 200 configured with first and second hydraulic circuits 201 and 202 which are each provided with two wheels and control a flow of hydraulic pressure delivered to the wheel cylinder 40 that is provided at each of the wheels RR, RL, FR, and FL, a first cut valve 261 provided at the first backup flow path 251 connecting the first hydraulic port 24*a* to the first hydraulic circuit 201 to control a flow of hydraulic pressure therein, a second cut valve 262 provided at a second backup flow path 252 connecting the second hydraulic port 24*b* to the second hydraulic circuit 202 to control a flow of hydraulic pressure therein, and an electronic control unit (ECU) (not shown) configured to control the hydraulic pressure supply device 100 and valves 54, 60, 221, 222, 223, 224, 231, 232, 241, 242, 261, and 262 on the basis of hydraulic pressure information and pedal displacement information.

The hydraulic pressure supply device 100 includes a hydraulic pressure chamber 110 in which a predetermined space is formed to receive and store oil, a hydraulic piston 120 and a hydraulic spring 122 provided inside the hydraulic pressure chamber 110, a motor 140 configured to generate a rotational force in response to an electrical signal of the pedal displacement sensor 11, and a power conversion unit 130 configured to convert a rotational movement of the motor 140 into a rectilinear movement to rectilinearly move the hydraulic piston 120. At this point, the reservoir 30 and the hydraulic pressure chamber 110 are connected to each other by an oil flow path 101 to supply oil to the hydraulic pressure chamber 110. Here, a signal sensed by the pedal displacement sensor 11 is transmitted to the ECU (not shown), and the ECU controls the motor 140 and valves provided in the electric brake system of the present disclosure, which will be described below. An operation of controlling a plurality of valves according to a displacement of the brake pedal 10 will be described below.

The hydraulic pressure chamber 110 is connected to the reservoir 30 by the oil flow path 101, and receives and stores the oil. The oil flow path 101 is connected to an oil port 111 formed at an inlet side of the hydraulic pressure chamber 110. At this point, a sealing member 113 is provided inside the hydraulic pressure chamber 110 and comes into contact with the hydraulic piston 120 to prevent the oil from leaking. The sealing member 113 is installed at both sides of the oil port 111 connected to the oil flow path 101 inside the hydraulic pressure chamber 110.

Also, a check valve 112 is installed to be continuous with an outlet side of the hydraulic pressure chamber 110 to prevent oil pressure from back flowing toward an oil supply flow path 102 connected to the reservoir 30. The check valve 112 blocks oil inside the hydraulic pressure chamber 110 from being lost to the reservoir 30 when the hydraulic piston 120 moves forward, and causes the oil to be suctioned and stored in the hydraulic pressure chamber 110 when the hydraulic piston 120 returns.

The hydraulic piston 120 pressurizing the hydraulic pressure chamber 110 is connected to the power conversion unit 130 which converts the rotational force of the motor 140 into a rectilinear movement and slides inside the hydraulic pressure chamber 110.

The power conversion unit 130 is a device that converts a rotational force into a rectilinear movement and may be configured with a ball screw nut assembly. For example, the power conversion unit 130 may be configured with a screw which is integrally formed with a rotational shaft (not shown) of the motor 140, and a ball nut which is screw-coupled to the screw in a state in which a rotation of the ball nut is restricted to perform rectilinear movement according to a rotation of the screw. That is, the screw serves as the rotational shaft of the motor 140 and also to linearly move the ball nut. The hydraulic piston 120 is connected to the ball nut of the power conversion unit 130 to pressurize the hydraulic pressure chamber 110 by the rectilinear movement of the ball nut, and the hydraulic spring 122 serves to return the hydraulic piston 120 to an original position thereof while the ball nut is returned to an original position thereof.

Also, while the hydraulic piston 120 is returned to the original position thereof, the hydraulic pressure chamber 110 and the reservoir 30 communicate with each other. For example, the oil inside the reservoir 30 flows into the hydraulic pressure chamber 110 and prevents negative pressure from being formed.

Meanwhile, although not shown in the drawing, the power conversion unit 130 may be configured with a ball nut which is rotated by receiving a rotational force from the rotational shaft of the motor 140, and a screw which is screw-coupled to the ball nut in a state in which a rotation of the screw is restricted to perform rectilinear movement according to a rotation of the ball nut. Such a ball screw nut assembly is a device that converts a rotational movement into a rectilinear movement, and since a structure thereof is generally known in the art, a detailed description thereof will be omitted. Also, it should be understood that the power conversion unit 130 according to the present disclosure may employ any structure capable of converting a rotational movement into a rectilinear movement in addition to the structure of the ball screw nut assembly.

The motor 140 is an electric motor for generating a rotational force in response to a signal output from the ECU, and generates the rotational force in a forward or backward direction by the ECU. At this point, precise control may be realized by controlling a rotational angle or a speed of the motor 140. Since such a motor 140 is generally known in the art, a detailed description thereof will be omitted.

Meanwhile, as one example of the hydraulic pressure supply device 100, a single acting piston, with which the single hydraulic pressure chamber 110 and the single hydraulic piston 120 are provided, is shown in the drawing. Unlike the drawing, the hydraulic pressure supply device 100 may include a double acting piston with which a pair of hydraulic pressure chambers are provided at both sides of a single hydraulic piston, and a tandem type piston with which a pair of hydraulic pressure chambers are provided at one side of each of a pair of hydraulic pistons.

The hydraulic pressure control unit 200 is configured with the first hydraulic circuit 201 and the second hydraulic circuit 202, each of which receives hydraulic pressure and controls two wheels. As shown in the drawing, the first hydraulic circuit 201 may control the front right wheel FR and the rear left wheel RL, and the second hydraulic circuit 202 may control the front left wheel FL and the rear right wheel RR. The wheel cylinder 40 is installed at each of the wheels FR, FL, RR, and RL, and performs braking by receiving the hydraulic pressure. That is, the hydraulic pressure control unit 200 receives the hydraulic pressure from the hydraulic pressure supply device 100 through a main hydraulic flow path 210 connected to the first and second hydraulic circuits 201 and 202, and the first and second hydraulic circuits 201 and 202 include a plurality of valves 221, 222, 223, 224, 231, 232, 233, 234, 241, and 242 to control a flow of the hydraulic pressure.

The first hydraulic circuit 201 includes first and second inlet valves 221 and 222 connected to the main hydraulic flow path 210 and configured to control the hydraulic pressure delivered to the wheel cylinders 40, first and second dump valves 231 and 232 configured to control a flow of oil discharged from the wheel cylinders 40 provided in the first hydraulic circuit 201, and a first balance valve 241 configured to connect and block a flow path between the two wheel cylinders 40 connected to the first inlet valve 221 and the second inlet valve 222. More particularly, the first inlet valve 221 is provided at a first hydraulic flow path 211 connected to the main hydraulic flow path 210 and the front right wheel FR, and the second inlet valve 222 is provided at a second hydraulic flow path 212 connected to the main hydraulic flow path 210 and the rear left wheel RL. The first dump valve 231 is connected to the first hydraulic flow path 211 and controls hydraulic pressure discharged from the wheel cylinder 40 of the front right wheel FR, and the second dump valve 232 is connected to the second hydraulic flow path 212 and controls hydraulic pressure discharged from the wheel cylinder 40 of the rear left wheel RL. The first balance valve 241 is provided at a flow path connecting the first hydraulic flow path 211 to the second hydraulic flow path 212, and serves to connect and block the first and second hydraulic flow paths 211 and 212 to and from each other according to opening and closing operations.

The second hydraulic circuit 202 includes third and fourth inlet valves 223 and 224 connected to the main hydraulic flow path 210 and configured to control hydraulic pressure delivered to the wheel cylinders 40, third and fourth dump valves 233 and 234 configured to control a flow of oil discharged from the wheel cylinders 40 provided at the second hydraulic circuit 202, and a second balance valve 242 configured to connect and block a flow path between the two wheel cylinders 40 connected to the third inlet valve 223 and the fourth inlet valve 224. More particularly, the third inlet valve 223 is provided at a third hydraulic flow path 213 connected to the main hydraulic flow path 210 and the rear right wheel RR, and the fourth inlet valve 224 is provided at a fourth hydraulic flow path 214 connected to the main hydraulic flow path 210 and the front left wheel FL. The third dump valve 233 is connected to the third hydraulic flow path 213 and controls hydraulic pressure discharged from the wheel cylinder 40 of the rear right wheel RR, and the fourth dump valve 234 is connected to the fourth hydraulic flow path 214 and controls hydraulic pressure discharged from the wheel cylinder 40 of the front left wheel FL. The second balance valve 242 is provided at a flow path connecting the third hydraulic flow path 213 to the fourth hydraulic flow path 214, and serves to connect and block the third and fourth hydraulic flow paths 213 and 214 to and from each other according to opening and closing operations.

Meanwhile, an example has been shown and described in which the first balance valve 241 is connected to the first and second inlet valves 221 and 222, and the second balance valve 242 is connected to the third and fourth inlet valves 223 and 224, but the present disclosure is not limited thereto. Alternatively, the first balance valve 241 may be connected to two inlet valves among the first to fourth inlet valves 221, 222, 223, and 224, and the second balance valve 242 may be connected to the remaining two inlet valves. That is, the first balance valve 241 may be connected to the first and third inlet valves 221 and 223, or to the first and fourth inlet valves 221 and 224. It should be understood that such a connection structure between the balance valves 241 and 242 and the inlet valves 221, 222, 223, and 224 may be selectively altered and used according to a demand of a user and a configuration of a system.

The opening and closing operations of each of the first to fourth inlet valves 221, 222, 223, and 224 are independently controlled by the ECU to deliver the hydraulic pressure generated at the hydraulic pressure supply device 100 to the wheel cylinders 40. That is, the first and second inlet valves 221 and 222 are configured to control the hydraulic pressure supplied to the first hydraulic circuit 201, and the third and fourth inlet valves 223 and 224 are configured to control the hydraulic pressure supplied to the second hydraulic circuit 202.

Also, opening and closing operations of each of the first to fourth dump valves 231, 232, 233, and 234 are independently controlled by the ECU. The first and second dump valves 231 and 232 are configured to control the hydraulic pressure discharged from the wheel cylinders 40 of the first hydraulic circuit 201, and the third and fourth dump valves 233 and 234 are configured to control the hydraulic pressure discharged from the wheel cylinders 40 of the second hydraulic circuit 202.

In accordance with one embodiment of the present disclosure, two inlet valves among the four inlet valves 221, 222, 223, and 224 may be configured to be opened so that the hydraulic pressure is delivered to the wheel cylinder 40 of each of the wheels FR, FL, RR, and RL. For example, as shown in FIG. 2, the first inlet valve 221 among the first and second inlet valves 221 and 222 is opened and the fourth inlet valve 224 among the third and fourth inlet valves 223 and 224 is opened so that the hydraulic pressure is delivered to the wheel cylinder 40 of each of the wheels FR, FL, RR, and RL. That is, the hydraulic pressure passing the first and fourth inlet valves 221 and 224 is delivered to adjacent wheel cylinders 40 through the first and second balance valves 241 and 242. At this point, an example is shown in which the first hydraulic circuit 201 and the second hydraulic circuit 202 open the inlet valves 221 and 224 to deliver the hydraulic pressure to each of the wheel cylinders 40, but the present disclosure is not limited thereto. Alternatively, according to a structure of the flow path connection, the two inlet valves 221 and 222 provided at the first hydraulic circuit 201 or the two inlet valves 223 and 224 provided at the second hydraulic circuit 202 may be opened to deliver the hydraulic pressure to each of the wheel cylinders 40. Meanwhile, when emergency braking is required, all of the inlet valves 221, 222, 223, and 224 may be opened to rapidly deliver the hydraulic pressure to the wheel cylinders 40.

Such first to fourth inlet valves 221, 222, 223, and 224 are configured with normally closed type solenoid valves that are usually closed and are opened when an opening signal is received.

Also, the first and second balance valves 241 and 242 are configured with normally open type solenoid valves that are usually open and are closed when a closing signal is received from the ECU, and the first to fourth dump valves 231, 232, 233, and 234 are configured with normally closed type solenoid valves that are usually closed and are opened when the opening signal is received.

In accordance with one aspect of the present disclosure, the first and second backup flow paths 251 and 252 are provided to supply oil discharged from the master cylinder 20 to the wheel cylinders 40 when the electric brake system operates abnormally. More particularly, the first cut valve 261 configured to control a flow of the oil is provided at the first backup flow path 251, and the second cut valve 262 configured to control a flow of the oil is provided at the second backup flow path 252. Also, the first backup flow path 251 connects the first hydraulic port 24a to the first hydraulic circuit 201, and the second backup flow path 252 connects the second hydraulic port 24b to the second hydraulic circuit 202. As shown in the drawing, the first backup flow path 251 is connected to the first balance valve 241, which connects the first hydraulic flow path 211 to the second hydraulic flow path 212, and the second backup flow path 252 is connected to the second balance valve 242, which connects the third hydraulic flow path 213 and the fourth hydraulic flow path 214. Operational structures of the first and second cut valves 261 and 262 will be described again below.

The first and second cut valves 261 and 262 are configured with normally open type solenoid valves that are usually open and are closed when the closing signal is received from the ECU.

Meanwhile, an undescribed reference symbol 'PS1' is a first pressure sensor which senses oil pressure of the master cylinder 20, and an undescribed reference symbol 'PS2' is a second pressure sensor which senses hydraulic pressure discharged from the hydraulic pressure supply device 100 to the wheel cylinders 40. Also, an undescribed reference number '60' is an inspection valve including an inner flow path having one side that is connected to the reservoir 30 and the other side that is connected to the master cylinder 20 and the hydraulic pressure supply device 100 through a branching flow path. The inspection valve 60 is configured with a normally open type solenoid valves that is usually open and is closed when the closing signal is received from the ECU. The inspection valve 60 is provided for inspecting whether a leak occurs in the electric brake system, and it will be described again below.

Hereinafter, an operation of the electric brake system according to one embodiment of the present disclosure will be described in detail.

FIG. 2 is a hydraulic circuit diagram illustrating a state in which the electric brake system according to one embodiment of the present disclosure normally performs a braking operation.

Referring to FIG. 2, when a driver begins braking, an amount of braking requested by the driver may be sensed through the pedal displacement sensor 11 on the basis of information including pressure applied to the brake pedal 10 by the driver or the like. The ECU (not shown) receives an electrical signal output from the pedal displacement sensor 11 and operates the motor 140.

Also, the ECU may receive an amount of regenerative braking through the first pressure sensor PS1 provided at the outlet side of the master cylinder 20 and the second pressure sensor PS2 provided at the main hydraulic flow path 210, and may calculate an amount of braking friction on the basis of a difference between the amount of braking requested by the driver and the amount of regenerative braking to determine a magnitude of an increase or decrease of pressure at each of the wheel cylinders 40.

In particular, when the driver steps on the brake pedal 10 at an initial stage of braking, the motor 140 is operated, a rotational force of the motor 140 is converted into a rectilinear movement by the power conversion unit 130, and the hydraulic piston 120 is moved forward to pressurize the hydraulic pressure chamber 110 to generate hydraulic pressure. That is, hydraulic pressure discharged from the hydraulic pressure chamber 110 is delivered to the wheel cylinders 40 through the first to fourth hydraulic flow paths 211, 212, 213, and 214, each of which is connected to the main hydraulic flow path 210. At this point, the first and second cut valves 261 and 262 respectively installed at the first and second backup flow paths 251 and 252, which are respectively connected to the first and second hydraulic ports 24a and 24b, are closed so that hydraulic pressure generated in the master cylinder 20 is not delivered to the wheel cylinders 40.

In addition, the hydraulic pressure generated by the hydraulic pressure chamber 110 is delivered to the wheel cylinders 40 of the front right wheel FR and the front left wheel FL according to opening of the first and fourth inlet valves 221 and 224 to generate a braking force. At the same time, the hydraulic pressure delivered through the first and fourth inlet valves 221 and 224 is delivered to the wheel cylinders 40 of the rear left wheel RL and the rear right wheel RR through the first and second balance valves 241 and 242 which are open. That is, the hydraulic pressure is supplied to all of the wheel cylinders 40 through the opening operation of the two inlet valves 221 and 224 selected among the four inlet valves 221, 222, 223, and 224.

Such an operation is a general braking operation, and, when emergency braking is required, all of the inlet valves 221, 222, 223, and 224 may be opened to rapidly deliver hydraulic pressure to the wheel cylinders 40.

Meanwhile, the pressure generated by means of the pressurization of the master cylinder 20 according to the pedal effort of the brake pedal 10 is delivered to the simulation device 50 connected to the master cylinder 20. At this point, the normally closed type simulation valve 54 disposed at the rear end of the simulation chamber 51 is opened so that the oil filled in the simulation chamber 51 is delivered to the reservoir 30 through the simulation valve 54. Also, the reaction force piston 52 is moved, and pressure corresponding to a reaction force of the reaction force spring 53 supporting the reaction force piston 52 is generated inside the simulation chamber 51 to provide an appropriate pedal feeling to the driver.

Next, a case of releasing a braking force in a braking state established when the electric brake system operates normally as described above will be described with reference to FIG. 3. As shown in FIG. 3, when a pedal effort applied to the brake pedal 10 is released, the motor 140 generates a rotational force in a reverse direction in comparison to when the hydraulic piston 120 is moved forward to move the hydraulic piston 120 backward and return the hydraulic piston 120 to the original position thereof. At this point, opening and closing operational states of the first to fourth inlet valves 221, 222, 223, and 224, the first to fourth dump valves 231, 232, 233, and 234, and the first and second balance valves 241 and 242 are controlled in the same way as they are in the braking operation. That is, the first to fourth dump valves 231, 232, 233, and 234 and the second and third inlet valves 222 and 223 are closed, whereas the first and fourth inlet valves 221 and 224 are opened. As a result, hydraulic pressure discharged from the wheel cylinders 40 of the first hydraulic circuit 201 is delivered to the hydraulic pressure chamber 110 through the first balance valve 241 and the first inlet valve 221, and hydraulic pressure discharged from the wheel cylinders 40 of the second hydraulic circuit 202 is delivered to the hydraulic pressure chamber 110 through the second balance valve 242 and the fourth inlet valve 224.

In the simulation device 50, the oil inside the simulation chamber 51 is delivered to the master cylinder 20 according to the reaction force piston 52 being returned to the original position thereof by the reaction force spring 53, and oil is refilled inside the simulation chamber 51 through the simulation valve 54 and the simulation check valve 55 which are connected to the reservoir 30 to ensure a rapid return of pressure of the pedal simulator.

Meanwhile, when the hydraulic piston 120 is moved through the hydraulic pressure supply device 100 of the electric brake system, a flow of oil inside the hydraulic pressure chamber 110 is controlled through the oil flow path 101 and the oil supply flow path 102 which are connected to the reservoir 30.

Further, the electric brake system according to one embodiment of the present disclosure may control the valves 221, 222, 223, 224, 231, 232, 233, 234, 241, and 242 provided at the hydraulic pressure control unit 200 according to pressure required for the wheel cylinder 40 provided at each of the wheels RR, RL, FR, and FL of the two hydraulic circuits 201 and 202, thereby specifying and controlling a control range. For example, FIG. 4 shows a case of braking only a corresponding wheel cylinder while an anti-lock brake system (ABS) is operated, and a state of braking only the left wheels FL and RL is illustrated.

Referring to FIG. 4, the motor 140 is operated according to a pedal effort of the brake pedal 10, a rotational force of the motor 140 is converted into a rectilinear movement, and the hydraulic piston 120 is moved forward to pressurize the hydraulic pressure chamber 110 to generate hydraulic pressure. At this point, the first and second cut valves 261 and 262 are closed so that the hydraulic pressure generated in the master cylinder 20 is not delivered to the wheel cylinders 40. Also, the first and third inlet valves 221 and 223, the first to fourth dump valves 231, 232, 233, and 234, and the first and second balance valves 241 and 242 are controlled to be closed. Consequently, the hydraulic pressure generated by the hydraulic pressure chamber 110 is delivered to the wheel cylinder 40 of the rear left wheel RL through the second inlet valve 222, and to the wheel cylinder 40 of the front left wheel FL through the fourth inlet valve 224. Therefore, the hydraulic pressure is delivered to only the left wheels RL and FL among the wheels RL, RR, FL, and FR.

In accordance with one aspect of the present disclosure, the operations of the first to fourth inlet valves 221, 222, 223, and 224, the first to fourth dump valves 231, 232, 233, and 234, and the first and second balance valves 241 and 242 may be independently controlled as described above so that hydraulic pressure may be delivered to only the rear wheels RR and RL, or may be delivered to the wheel cylinders 40 of the front right wheel FR and the rear right wheel RR or the front right wheel FR and the rear left wheel RL, which require the hydraulic pressure.

Also, the electric brake system according to the present disclosure may discharge braking pressure from only a corresponding wheel cylinder 40 through the first to fourth dump valves 231, 232, 233, and 234 among the wheel cylinders 40 to which the braking pressure was supplied. For example, FIG. 5 shows a case in which the electric brake system operates in a dump mode and discharges hydraulic pressure from only a corresponding wheel cylinder 40, and a case of dumping only the left wheels RL and FL is illustrated.

Referring to FIG. 5, the second and fourth inlet valves 222 and 224, the first and third dump valves 231 and 233, and the first and second balance valves 241 and 242 are controlled to be closed, and the second and fourth dump valves 232 and 234 are opened. Consequently, the hydraulic pressure discharged from the wheel cylinders 40 installed at the rear left wheel RL and the front left wheel FL is delivered to the reservoir 30 through the second and fourth dump valves 232 and 234.

At this point, the first and third inlet valves 221 and 223 are opened together with the dump mode in which the hydraulic pressure of the corresponding wheel cylinders 40 is discharged according to the opening of the second and fourth dump valves 232 and 234 so that the hydraulic pressure may be supplied to the front right wheel FR and the rear right wheel RR.

As described above, each of valves 221, 222, 223, 224, 231, 232, 233, 234, 241, and 242 of the hydraulic pressure control unit 200 may be independently controlled to selectively deliver or discharge hydraulic pressure to and from the wheel cylinder 40 of each of the wheels RL, RR, FL, and FR according to a required pressure so that a precise control of hydraulic pressure may be possible.

Lastly, a case in which the electric brake system operates abnormally will be described. FIG. 6 is a hydraulic circuit diagram illustrating a case in which the electric brake system according to one embodiment of the present disclosure operates abnormally.

Referring to FIG. 6, when the electric brake system operates abnormally, each of the valves 54, 60, 221, 222, 223, 224, 231, 232, 233, 234, 241, 242, 261, and 262 is provided in an initial state of braking, that is, a non-operating state. When a driver pressurizes the brake pedal 10, the input rod 12 connected to the brake pedal 10 is moved in a leftward direction, and at the same time the first piston 21*a*, which comes in contact with the input rod 12, is moved in the leftward direction and the second piston 22*a* is also moved in the leftward direction by the first piston 21*a*.

At this point, since there is no gap between the input rod 12 and the first piston 21*a*, braking may be rapidly performed.

Further, hydraulic pressure generated by a pressurization of the master cylinder 20 is delivered to the wheel cylinders 40 through the first and second backup flow paths 251 and 252 which are connected for the purpose of braking in a backup mode to realize a braking force. At this point, the first and second cut valves 261 and 262 respectively installed at the first and second backup flow paths 251 and 252 and the first and second balance valves 241 and 242 respectively installed at the first and second backup flow paths 251 and 252 are configured with normally open type solenoid valves, and the simulation valve 54, the first to fourth inlet valves 221, 222, 223, and 224, and the first to fourth dump valves 231, 232, 233, and 234 are configured with normally closed type solenoid valves so that the hydraulic pressure is directly delivered to the wheel cylinders 40. Therefore, braking is stably realized to improve braking safety.

An inspection method for inspecting whether a hydraulic pressure leak occurs through an electric brake system having the above described structure will be described. At this point, the inspection method for inspecting whether a hydraulic pressure leak occurs performs a first inspection mode for inspecting whether a leak occurs at the simulation valve 54, the simulation check valve 55, and the sealing member 23 provided inside the chambers 25*a* and 25*b* of the master cylinder 20, and a second mode for inspecting whether a leak occurs at the sealing member 113 provided inside the hydraulic pressure chamber 110 of the hydraulic pressure supply device 100 and the check valve 112 provided at the oil supply flow path 102 connected to the reservoir 30 to be continuous with the outlet side of the hydraulic pressure supply device 100. The first and second inspection modes will each be described below.

Firstly, an inspection mode, that is, the first inspection mode, for inspecting whether a leak occurs at the simulation valve 54, the simulation check valve 55, and the sealing member 23 provided inside the chambers 25*a* and 25*b* of the master cylinder 20 will be described with reference to FIGS. 7 and 8.

FIG. 7 is a hydraulic circuit diagram illustrating a state of inspecting whether a leak occurs in an electric brake system according to another embodiment of the present disclosure.

Referring to FIG. 7, the inspection valve 60 is provided at a flow path connecting the master cylinder 20 to the reservoir 30 in the electric brake system. The inspection valve 60 may be installed between the reservoir 30 and the first chamber 25*a*, which is provided between the first piston 21*a* and the second piston 22*a* of the master cylinder 20, to control hydraulic pressure delivered between the reservoir 30 and the master cylinder 20. The inspection valve 60 may be configured with a normally open type solenoid valve that is usually open and is closed when a closing signal is received.

The inspection method through the electric brake system including the inspection valve 60 may be performed while a vehicle is stopped. Firstly, in a state in which the inspection valve 60 is open, the first and second cut valves 261 and 262, which are provided at flow paths, that is, at the first and second backup flow paths 251 and 252 connecting the master cylinder 20 to the hydraulic pressure control unit 200, are closed. That is, a structure of the above is the same as that of a general braking mode.

Next, the first piston 21*a* disposed inside the master cylinder 20 is pressurized according to a pedal effort of the brake pedal 10 and whether pressure is formed thereat is sensed through the first pressure sensor PS1. At this point, when pressure is formed in the master cylinder 20, a leak is determined as not occurring and the first inspection mode is terminated. Otherwise, when pressure is not formed in the master cylinder 20 or a value of the pressure being formed is less than a set value of pressure, a leak is determined as occurring at one among the simulation valve 54, the simulation check valve 55, and the sealing member 23 and the following inspection is performed.

As one example, when pressure is not formed, the brake pedal 10 is returned to the original position thereof. That is, the first piston 21*a* is returned to the original position thereof. Thereafter, as shown in FIG. 8, the inspection valve 60 and the cut valves 261 and 262 are closed so that the chambers 25*a* and 25*b* inside the master cylinder 20 are altered to form a closed circuit. Here, the reason for closing the inspection valve 60 and the cut valves 261 and 262 is that it is difficult to identify whether a leak occurs when the hydraulic pressure generated by the master cylinder 20 flows into the reservoir 30 through the inspection valve 60 or into the wheel cylinders 40 through the cut valves 261 and 262 so that a loss of the pressure occurs.

In a state in which the inspection valve 60 and the cut valves 261 and 262 are closed, the first piston 21*a* disposed inside the master cylinder 20 is pressurized by the pedal effort of the brake pedal 10 and whether pressure is formed is sensed through the first pressure sensor PS1. That is, a leaking portion is detected according to the sensing of whether pressure is formed through the first pressure sensor PS1.

For example, a leak is determined as occurring at the sealing member 23 when the first pressure sensor PS1 detects pressure being formed, whereas a leak is determined as occurring at the simulation valve 54 or the simulation check valve 55 when the first pressure sensor PS1 does not detect pressure being formed. The reason for that is that hydraulic pressure is not formed when the hydraulic pressure leaks into the simulation valve 54 and the simulation check valve 55 when the hydraulic pressure is formed again in a state in which the pressure is not formed in an initial inspection, and the closed circuit is provided between the reservoir 30 and the master cylinder 20 by the inspection valve 60 even when the hydraulic pressure leaks through the sealing member 23 so that the hydraulic pressure is formed and a leak is determined as occurring at the sealing member 23.

Next, the second inspection mode for inspecting whether a leak occurs at the sealing member 113 provided inside the hydraulic pressure chamber 110 of the hydraulic pressure supply device 100 and the check valve 112 provided at the oil supply flow path 102 connected to the reservoir 30 to be continuous with the outlet side of the hydraulic pressure supply device 100 will be described with reference to FIGS. 9 and 10.

FIG. 9 is a hydraulic circuit diagram illustrating a state of inspecting whether a leak occurs in an electric brake system according to still another embodiment of the present disclosure.

Referring to FIG. 9, the inspection valve 60 is provided at a flow path connecting the reservoir 30 to the hydraulic pressure supply device 100 in the electric brake system. The inspection valve 60 may be installed at the oil flow path 101 connecting the reservoir 30 to the hydraulic pressure chamber 110 of the hydraulic pressure supply device 100 to control hydraulic pressure delivered between the reservoir 30 and the hydraulic pressure supply device 100. The inspection valve 60 may be configured with a normally open type solenoid valve that is usually open and is closed when a closing signal is received.

The inspection method through the electric brake system including the inspection valve 60 may be performed while a vehicle is stopped. Firstly, in a state in which the inspection valve 60 is open, the first and second cut valves 261 and 262 provided at flow paths, that is, at the backup flow paths 251 and 252 connecting the master cylinder 20 to the hydraulic pressure control unit 200, are closed. The reason for that is to prevent hydraulic pressure discharged from the hydraulic pressure supply device 100 from being delivered to the master cylinder 20 through the first and second backup flow paths 251 and 252 via the inlet valves 221, 222, 223, and 224.

Next, the hydraulic pressure supply device 100 is operated to pressurize the hydraulic piston 120 disposed inside the hydraulic pressure chamber 110 and whether pressure is formed thereat is sensed through the second pressure sensor PS2. At this point, when hydraulic pressure is detected in the hydraulic pressure supply device 100, that is, when pressure is formed, a leak is determined as not occurring and the second inspection mode is terminated. Otherwise, when pressure is not formed in the hydraulic pressure chamber 110, or a value of the pressure being formed is less than a set value thereof, a leak is determined as occurring at one of the sealing member 113 and the check valve 112 and the following inspection is performed.

As one example, when pressure is not formed, the hydraulic piston 120 inside the hydraulic pressure chamber 110 is returned to the original position thereof. That is, the hydraulic piston 120 is returned to the original position thereof through the motor 140 and the power conversion unit 130. Thereafter, as shown in FIG. 10, the inspection valve 60 and the cut valves 261 and 262 are closed so that the hydraulic pressure chamber 110 of the hydraulic pressure supply device 100 is changed to form a closed circuit. Here, the reason for closing the inspection valve 60 and the cut valves 261 and 262 is that it is difficult to identify whether a leak occurs when the hydraulic pressure generated by the hydraulic pressure supply device 100 flows into the reservoir 30 through the inspection valve 60 or into the master cylinder 20 through the cut valves 261 and 262 so that a loss of the pressure occurs.

In a state in which the inspection valve 60 and the cut valves 261 and 262 are closed, the hydraulic piston 120 disposed inside the hydraulic pressure chamber 110 is moved to discharge the hydraulic pressure, and whether pressure is formed thereat is sensed through the second pressure sensor PS2. That is, a leak portion is detected through the second pressure sensor PS2 according to whether pressure is formed.

For example, a leak is determined as occurring at the sealing member 113 when the second pressure sensor PS2 detects pressure being formed, whereas a leak is determined as occurring at the check valve 112 when the second pressure sensor PS2 does not detect pressure being formed. The reason for that is that hydraulic pressure is not formed when the hydraulic pressure leaks into the check valve 112 when the hydraulic pressure is formed again in a state in which the pressure is not formed in an initial inspection, and the closed circuit is provided between the reservoir 30 and the hydraulic pressure chamber 110 by the inspection valve 60 even when the hydraulic pressure leaks through the sealing member 113 so that the hydraulic pressure is formed and a leak is determined as occurring at the sealing member 113.

As described above, the inspection valve 60 is provided and whether a leak occurs in the electric brake system is inspected through the opening and closing operations of the inspection valve 60 so that a safety hazard may be prevented. At this point, the inspection mode may be controlled to be executed when a predetermined time passes after a vehicle has been stopped, in a state in which a hand brake is currently operated, or when a driver applies a predetermined braking force to the vehicle. Also, in the inspection mode state, it is possible to rapidly eliminate hydraulic pressure from the wheel cylinders 40 when it is determined that the driver intends to accelerate the vehicle Meanwhile, the inspection valve 60 includes an inner flow path, which is open and closed according to opening and closing operations, having one side connected to the reservoir 30 and the other side connected to the master cylinder 20 and the hydraulic pressure supply device 100 through a branching flow path. Therefore, the inspection valve 60 is controlled to open the flow path connecting the reservoir 30 to the master cylinder 20 and connecting the reservoir 30 to the hydraulic pressure supply device 100 in the braking mode, and to close the flow path connecting the reservoir 30 to the master cylinder 20 or connecting the reservoir 30 to the hydraulic pressure supply device 100 in the inspection mode. At this point, an undescribed reference number '62' is a check valve which is provided at the flow path, which is connecting the reservoir 30 to the master cylinder 20 and the reservoir 30 to the hydraulic pressure supply device 100, together with the inspection valve 60 to prevent the hydraulic pressure from being delivered to the reservoir 30.

As is apparent from the above description, the electric brake system and a leakage inspecting method thereof according to one embodiment of the present disclosure operate an inspection valve to alter a master cylinder to form a closed circuit so that leaks of a simulation valve and a simulation check value, which are connected to the master cylinder and a rear end part of a simulation device, may be inspected, which has an effect in which a safety hazard due to a leak of hydraulic pressure can be prevented.

Also, the inspection valve is operated to alter a hydraulic pressure chamber of a hydraulic pressure supply device to form a closed circuit so that whether hydraulic pressure discharged from the hydraulic pressure supply device leaks can be inspected.

In addition, only two inlet valves among four inlet valves, each of which controls a flow of hydraulic pressure delivered to wheel cylinders, are operated to apply pressure to all of the wheel cylinders, which has an effect in which operation noise and vibration of the valves can be minimized.

Further, a motor and the valves are interlocked and controlled with each other, which has an effect in which a precise control of pressure may be possible. In addition, two hydraulic circuits are respectively configured to be connected to two wheels and are independently controlled, and a hydraulic pressure supply device is interlocked and controlled with the two hydraulic circuits according to pressure required for each wheel and a priority determination logic, which has an advantage in that a control range can be increased.

Meanwhile, when a brake system fails, a pedal effort of a driver may be directly delivered to the master cylinder to enable braking of a vehicle so that a stable braking force can be provided.

As is described above, although the present disclosure has been described by way of a specific embodiment and the accompanying drawings, it is not limited thereto, and it should be understood that numerous other changes and modifications can be devised by those skilled in the art that fall within the spirit and scope of this disclosure and the full range of equivalents to which the appended claims are entitled.

What is claimed is:

1. A leakage inspecting method of an electric brake system, which includes a master cylinder connected to a reservoir that stores oil therein and configured to generate hydraulic pressure according to a pedal effort of a brake pedal, a simulation device having one side connected to the master cylinder to provide a reaction force according to the pedal effort of the brake pedal, the other side connected to the reservoir, and a simulation valve provided at a flow path connected to the master cylinder or a flow path connected to the reservoir, a hydraulic pressure supply device operated by an electrical signal of a pedal displacement sensor sensing a displacement of the brake pedal and configured to generate hydraulic pressure, and a hydraulic pressure control unit configured to control hydraulic pressure discharged from one or more of the master cylinder and the hydraulic pressure supply device and deliver the hydraulic pressure to a wheel cylinder provided at each of wheels, comprising:
   executing an inspection mode for inspecting for a leak of the simulation valve and a sealing member provided inside a chamber of the master cylinder by providing an inspection valve at a flow path connecting the master cylinder to the reservoir,
   wherein the inspection mode includes:
   (a1) closing a cut valve provided at a flow path connecting the master cylinder to the hydraulic pressure control unit when the inspection valve is open;
   (b1) pressurizing a piston disposed inside the master cylinder according to the pedal effort of the brake pedal and detecting whether pressure is formed through a pressure sensor; and
   (c1) determining that a leak does not exist when pressure detected through the pressure sensor satisfies a preset criterion.

2. The method of claim 1, wherein, when the pressure detected through the pressure sensor in the operation (c1) does not satisfy the preset criterion, determining that a leak has occurred at one or more of the simulation valve and the sealing member.

3. The method of claim 2, further comprising:
   (d1) returning the brake pedal to an original position thereof;
   (e1) closing the inspection valve, the simulation valve, and the cut valve to alter the chamber of the master cylinder to form a closed circuit;
   (f1) pressurizing the piston disposed inside the master cylinder according to the pedal effort of the brake pedal and detecting whether pressure is formed through the pressure sensor; and
   (g1) determining that the leak has occurred at the sealing member when the pressure detected through the pressure sensor satisfies the preset criterion, and determining that the leak has occurred at the simulation valve when the pressure detected through the pressure sensor does not satisfy the preset criterion.

4. A leakage inspecting method of an electric brake system, which includes a master cylinder connected to a reservoir that stores oil therein and configured to generate hydraulic pressure according to a pedal effort of a brake pedal, a simulation device having one side connected to the master cylinder to provide a reaction force according to the pedal effort of the brake pedal, a hydraulic pressure supply device operated by an electrical signal of a pedal displacement sensor sensing a displacement of the brake pedal and configured to generate hydraulic pressure, and a hydraulic pressure control unit configured to control hydraulic pressure discharged from one or more of the master cylinder and the hydraulic pressure supply device and deliver the hydraulic pressure to a wheel cylinder provided at each of wheels, comprising:
   executing an inspection mode for inspecting for a leak of a sealing member provided inside a hydraulic pressure chamber of the hydraulic pressure supply device and a check valve provided at a flow path connected to a reservoir at an outlet side of the hydraulic pressure supply device by providing an inspection valve at a flow path connecting the reservoir to an oil port of the hydraulic pressure supply device,
   wherein the inspection mode includes:
   (a2) closing a cut valve provided at a flow path connecting the master cylinder to the hydraulic pressure control unit when the inspection valve is open;
   (b2) operating the hydraulic pressure supply device to pressurize a hydraulic piston provided inside the hydraulic pressure chamber of the hydraulic pressure supply device and detecting whether pressure is formed through a pressure sensor; and
   (c2) determining that a leak does not exist when pressure detected through the pressure sensor satisfies a preset criterion.

5. The method of claim 4, wherein, when the pressure detected through the pressure sensor in operation (c2) does not satisfy the preset criterion, determining that a leak has occurred at one or more of the sealing member and the check valve.

6. The method of claim 5, further comprising:
   (d2) returning the hydraulic piston of the hydraulic pressure supply device to original position thereof;

(e2) closing the inspection valve and the cut valve to alter the hydraulic pressure chamber of the hydraulic pressure supply device to form a closed circuit;
(f2) operating the hydraulic pressure supply device to pressurize the hydraulic piston provided inside the hydraulic pressure chamber of the hydraulic pressure supply device and detecting whether pressure is formed through the pressure sensor; and
(g2) determining that the leak has occurred at the sealing member when the pressure detected through the pressure sensor satisfies the preset criterion, and determining that the leak has occurred at the check valve when the pressure detected through the pressure sensor does not satisfy the preset criterion.

7. An electric brake system, which includes a reservoir configured to store oil therein, a master cylinder having first and second hydraulic ports and coupled to the reservoir to receive the oil, a pedal displacement sensor configured to sense a displacement of a brake pedal, and a simulation device connected to the master cylinder and provided to supply a reaction force according to a pedal effort of the brake pedal, comprising:
  a hydraulic pressure supply device configured to output an electrical signal corresponding to an operation of the brake pedal through the pedal displacement sensor to operate a motor and convert a rotational force of the motor into a rectilinear movement;
  a hydraulic pressure control unit including first and second hydraulic circuits connected to the hydraulic pressure supply device through a hydraulic flow path, and configured to receive hydraulic pressure by means of a force generated by the hydraulic pressure supply device and control a flow of the hydraulic pressure delivered to wheel cylinders which are respectively provided at wheels; and
  an electronic control unit configured to control the motor and valves on the basis of hydraulic pressure information and pedal displacement information,
  wherein the electric brake system further includes:
  an inspection valve including an inner flow path having one side connected to the reservoir and the other side disposed to be connected to the master cylinder and the hydraulic pressure supply device through a branching flow path, and
  wherein the inspection valve is provided to open a flow path connecting the reservoir to the master cylinder and a flow path connecting the reservoir to the hydraulic pressure supply device in a braking mode, and close one or more of the flow path connecting the reservoir to the master cylinder and the flow path connecting the reservoir to the hydraulic pressure supply device.

8. The electric brake system of claim 7, wherein the hydraulic pressure control unit includes:
  first to fourth inlet valves respectively provided at an upstream side of the wheel cylinders and configured to control the hydraulic pressure delivered to the wheel cylinders respectively installed at the wheels;
  first to fourth dump valves configured to respectively control a flow of hydraulic pressure discharged from the wheel cylinder; and
  first and second balance valves respectively disposed between the first to fourth inlet valves and first to fourth dump valves, wherein the first balance valve is connected to two inlet valves among the first to fourth inlet valves and the second balance valve is connected to the remaining two inlet valves.

9. The electric brake system of claim 8, wherein one of the two inlet valves connected to each other through the first balance valve and one of the two inlet valves connected to each other through the second balance valve are open so that the hydraulic pressure is delivered to the wheel cylinders respectively installed at the wheels.

10. The electric brake system of claim 8, wherein the first to fourth inlet valves are configured with normally closed type solenoid valves that are usually closed and are opened when an opening signal is received.

11. The electric brake system of claim 8, wherein the first to fourth dump valves are configured with normally closed type solenoid valves that are usually closed and are opened when an opening signal is received.

12. The electric brake system of claim 8, wherein the first and second balance valves are configured with normally open type solenoid valves that are usually open and are closed when a closing signal is received from the electronic control unit.

13. The electric brake system of claim 8, further comprising:
  a first backup flow path configured to connect the first hydraulic port to the first balance valve directly supply oil to the wheel cylinder when the electric brake system operates abnormally;
  a second backup flow path configured to connect the second hydraulic port to the second balance valve;
  a first cut valve provided at the first backup flow path and configured to control a flow of the oil therein; and
  a second cut valve provided at the second backup flow path and configured to control a flow of the oil therein.

14. The electric brake system of claim 13, wherein the first and second cut valves are configured with normally open type solenoid valves that are usually open and are closed when a closing signal is received from the electronic control unit.

15. The electric brake system of claim 7, wherein the inspection valve is configured with a normally open type solenoid valve that is usually open and is closed when a closing signal is received from the electronic control unit.

16. The electric brake system of claim 7, further comprising:
  a first pressure sensor provided at a flow path connecting the master cylinder to the simulation device; and
  a second pressure sensor provided at a hydraulic flow path connecting the hydraulic pressure supply device and the hydraulic pressure control unit.

17. The electric brake system of claim 7, wherein the hydraulic pressure supply device includes:
  a motor configured to generate a rotational force in response to the electrical signal of the pedal displacement sensor;
  a power conversion unit configured to convert the rotational force of the motor into a rectilinear movement;
  a hydraulic piston connected to the power conversion unit and configured to perform rectilinear movement;
  a hydraulic pressure chamber provided so that the hydraulic piston slides therein and connected to the first and second hydraulic circuits though the hydraulic flow path; and
  a hydraulic spring provided inside the hydraulic pressure chamber and configured to elastically support the hydraulic piston,
  wherein the hydraulic pressure chamber is configured to be connected to the reservoir through an oil port and to receive the oil.

18. The electric brake system of claim 17, wherein a communicating hole is formed to be connected to the reservoir at an outlet side of the hydraulic pressure chamber, and a check valve is provided at a flow path connecting the communicating hole and the reservoir and configured to enable the oil to flow from the reservoir to the hydraulic pressure chamber and block the oil from flowing from the hydraulic pressure chamber to the reservoir.

19. The electric brake system of claim 7, wherein the simulation valve and a simulation check valve are provided in parallel at a flow path which connects a rear end part of a simulation chamber of the simulation device and the reservoir.

20. The electric brake system of claim 19, wherein the simulation valve is configured with a normally closed type solenoid valve that is usually closed and is opened when an opening signal is received.

\* \* \* \* \*